(12) United States Patent
Shi et al.

(10) Patent No.: US 10,459,103 B1
(45) Date of Patent: Oct. 29, 2019

(54) MAGNETIC ENTRY PORTAL IDENTIFICATION SYSTEM

(71) Applicant: AMAZON TECHNOLOGIES, INC., Seattle, WA (US)

(72) Inventors: Qicai Shi, Bothell, WA (US); Christopher Raymond Grajewski, Seattle, WA (US); Camerin Cole Hahn, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 238 days.

(21) Appl. No.: 15/280,869

(22) Filed: Sep. 29, 2016

(51) Int. Cl.
*G01N 27/72* (2006.01)
*G01V 3/08* (2006.01)
*H04B 17/318* (2015.01)
*G01V 8/00* (2006.01)
*G06K 7/08* (2006.01)
*H04W 4/80* (2018.01)

(52) U.S. Cl.
CPC ............. *G01V 3/08* (2013.01); *G01V 8/00* (2013.01); *G06K 7/087* (2013.01); *H04B 17/318* (2015.01); *H04W 4/80* (2018.02)

(58) Field of Classification Search
CPC ........... G01V 3/08; G01V 8/00; H04W 4/026; H04W 4/027; H04W 4/80; H04W 4/043; G05B 2219/40202; G05B 19/00; G08B 29/00; H04B 17/318; G06K 7/087; G01C 21/206; G07G 1/0081
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 10,162,057 B2 * | 12/2018 | Metzler | G01S 17/023 |

(Continued)

OTHER PUBLICATIONS

Abraham, John, "Understanding Bluetooth Advertising Packets. Bluetooth Advertising.", Mobile & Security. Jun. 4, 2014. Update Dec. 7, 2014. [Blog]. Retrieved from Internet: <URL: http://j2abro.blogspot.com/2014/06/understanding-bluetooth-advertising.html>.

(Continued)

*Primary Examiner* — Thang X Le
(74) *Attorney, Agent, or Firm* — Lindauer Law, PLLC

(57) ABSTRACT

An entry portal to a facility includes magnets to produce a magnetic field and a proximity sensor to detect passage of a user. A portable device carried by a user detects the magnetic field and generates magnetometer data which is then sent to the portal along with a device identifier. The magnetometer data is compared to expected magnetic field data to determine presence at the portal. Timestamps of the magnetometer data and data from the proximity sensor may be compared to determine whether the two events occurred contemporaneously. If so, the portable device is deemed to be present at the portal. The device identifier may be used to determine a user, and entry data indicative of entry of the user may be generated. Subsequently, the user may then be tracked using sensors in the facility.

20 Claims, 10 Drawing Sheets

(56) References Cited

U.S. PATENT DOCUMENTS

| | | | |
|---|---|---|---|
| 2011/0011936 A1 | 1/2011 | Morandi et al. | |
| 2012/0284132 A1 | 11/2012 | Kim et al. | |
| 2013/0046626 A1* | 2/2013 | Grigg | G06Q 30/0207 |
| | | | 705/14.53 |
| 2013/0284806 A1 | 10/2013 | Margalit | |
| 2014/0358681 A1* | 12/2014 | Satoh | G06Q 30/0255 |
| | | | 705/14.53 |
| 2015/0086107 A1 | 3/2015 | Dedeoglu et al. | |
| 2016/0297626 A1* | 10/2016 | Jochim | B65D 11/20 |
| 2017/0164319 A1* | 6/2017 | Skaaksrud | H04W 12/06 |
| 2017/0241801 A1* | 8/2017 | Fedtke | G01D 5/12 |
| 2018/0032763 A1* | 2/2018 | Bassett | G06K 7/087 |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Freescale Semiconductor, "Xtrinsic MAG3110 Three-Axis, Digital Magnetometer", Document No. MAG3110. Rev. 9.2, Feb. 2013. Retrievable from Internet: <URL: http://cache.freescale.com/files/sensors/doc/data_sheet/MAG3110.pdf>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_super mar­kets>.

Lindh, Joakim, "Bluetooth® Low Energy Beacons", Texas Instruments. Application Report. SWRA475. Jan. 2015. Retrieved from Internet: <URL: http://www.ti.com/lit/an/swra475/swra475.pdf>.

Pop, Cristian, "Introduction to the BodyCom Technology", AN1391, DS01391A, Microchip Technology, Inc., May 2, 2011.

Valtonen, Miika, "Technologies for Smart Environments: Capacitive User Tracking and Proactive Fuzzy Control", Tampere University of Technology. Publication 1044. 2012. Retrieved from Internet: <<http://dspace.cc.tut.fi/dpub/bitstream/handle/123456789/21002/valtonen.pdf?sequence=3&isAllowed=y>>.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

MAGNETIC ENTRY PORTAL IDENTIFICATION SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping area or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the entry of users into the facility, movement of inventory, users, and other objects within the facility, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
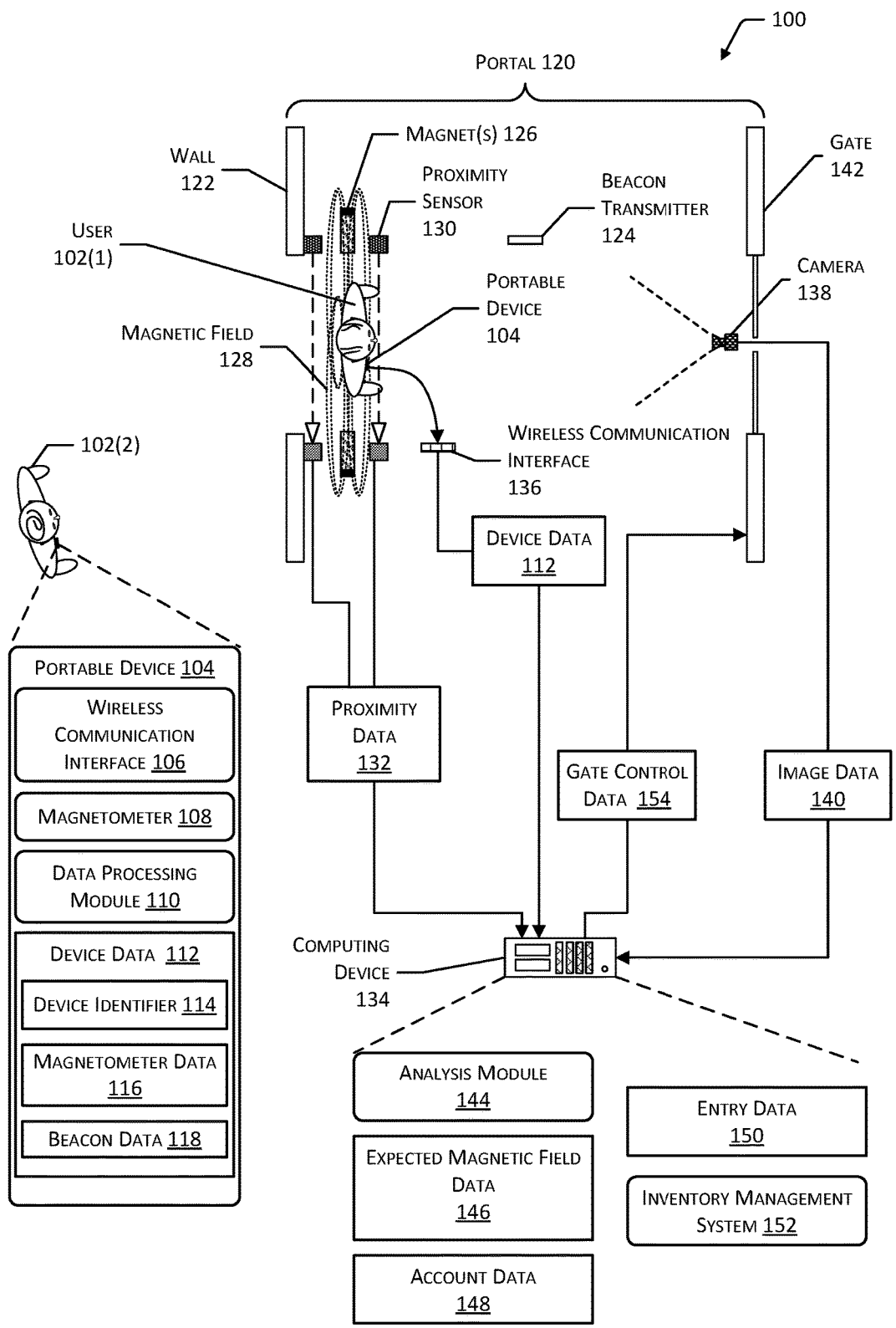
FIG. 1 illustrates a system to provide a portal at a facility through which users may travel and be identified, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

This disclosure describes systems and techniques for associating an account with a person or other object at a portal. In one implementation, one or more portals may be deployed at a materials handling facility (facility).

The facility may include, or have access to, an inventory management system. The inventory management system may be configured to maintain information about items, users, condition of the facility, and so forth. For example, the inventory management system may maintain data indicative of what items a particular user is ordered to pick, location of a particular user, availability of a user providing support services to others, requests for assistance, environmental status of the facility, and so forth. The inventory management system, or another system, may generate this data based on sensor data, such as images acquired from imaging sensors like cameras, weight sensors in shelves, and so forth. For example, the images may be used to identify an object such as a user or item, track the object, and so forth.

The portal allows users to enter the facility without impediment. From the perspective of a person passing through the portal, they pass without having to take any action. From the user's perspective, they approach and enter. If a gate or other physical access control device is used, the authorized user is granted access. For example, the user who is authorized approaches the portal and the gate therein opens for the user. After passage through the portal, an account may be associated with the particular user. Once the account has been associated, further tracking may maintain that association. For example, once identified using the portal, image data from cameras in the facility may be processed using "blob tracking" techniques to track that identified user as they move about in the facility.

A user is issued a portable device that has a device identifier. That device identifier is associated with the user account for that user. The portable device includes a wireless communication interface and a magnetometer.

One or more magnets create a magnetic field at the portal. Proximity sensors, such as an infrared (IR) light beam, provide proximity data about whether an object is present at the portal. As the user passes through the portal, the magnetometer detects the magnetic field and generates magnetometer data about the field. The portable device transmits device data that includes the magnetometer data and the device identifier. A receiver at the portal receives the device data and sends the device data to a computing device for processing.

The computing device determines if the proximity data and the magnetometer data were produced within a threshold time of each other. The magnetometer data as reported by the portable device is compared to expected magnetic field data to determine if the portable device was actually in the magnetic field of the portal. For example, if the magnetic field is expected to have a field strength of 500 microteslas (±50 microteslas) and the magnetometer data indicates a magnetic field strength of 487 microteslas, a positive comparison is determined. In some implementations a change in detected magnetic field strength may be used to determine a positive comparison. For example, a change in field strength of greater than 200 microteslas over a particular period of time may be used to determine the portable device was actually in the magnetic field of the portal. The device identifier may then be used to determine an account associated with the user. For example, the device identifier may be used to lookup an account identifier. If the user account is authorized access to the facility, a gate or other physical access control mechanism may be opened, allowing the user to enter.

Other comparisons may also be made to determine presence of the portable device at the portal. In one implementation, the received signal strength of the wireless signals exchanged between the portable device and the portal may be assessed. For example, the receiver at the portal may disregard data transmitted by the portable device unless the received signal strength is above a minimum threshold value. In another implementation, the portable device may be configured to respond to beacons transmitted by the portal that exhibit a received signal strength that is above a minimum threshold value.

The portable device may utilize various techniques to minimize power consumption and extend the life of an onboard battery. In one implementation, the portal may include a beacon transmitter. For example, a Bluetooth Low Energy beacon may be sent by the beacon transmitter. The portable device may periodically wake up from a low power mode to listen for beacons. If a beacon is detected, the frequency at which the portable device awakens may be increased. For example, if no beacon is detected, the portable device may listen for beacons every 5 seconds. If a beacon is detected, the portable device may listen for beacons every 1 second. When the portable device determines that the received signal strength of the beacon is greater than a threshold, the portable device then transitions to a full operational mode. While in the full operational mode, the portable device transmits the device data described above. As the received signal strength of the beacon decreases, such as with distance from the portal, the portable device may cease transmitting the device data and drop back into the low power mode.

In another implementation, the portable device may periodically transmit an advertisement message. A wireless communication interface at the portal may respond to the advertisement message. For example, responsive to the advertisement message, the wireless communication interface at the portal may establish a connection with the portable device. Based on this response, the portable device may begin acquiring magnetometer data, transmit the device data, or take other actions.

The portable device may comprise a standalone device. For example, the portable device may be provided in the form factor of a fob, name tag, and so forth. The portable device may be a device which provides other functionality. For example, the portable device may comprise a smartphone, wearable computing device, fitness tracker, and so forth.

By utilizing a magnetic field at the portal, the system provides for a distinctive signal to help corroborate presence of the portable device at that location at a particular time. Accuracy of the system is further improved with the use of the proximity sensors, comparison of received signal strengths, and so forth. Based on this information, the user may be identified at the gate quickly and easily, facilitating operation of the facility. This information may then be used by an inventory management system to associate particular interactions such as the pick or place of items from an inventory location with a particular account. As a result, the overall operation of the facility and the user experience may be improved.

Illustrative System

FIG. 1 illustrates a system 100 to provide a portal at a facility through which users may travel and be identified as users, according to some implementations. A user 102 has a portable device 104 in their possession. The portable device 104 may include a wireless communication interface 106 and magnetometer 108. The wireless communication interface 106 may include a transmitter, receiver, antenna, and so forth. The wireless communication interface 106 may be compatible with one or more of Bluetooth, Bluetooth Low Energy (BLE), Wi-Fi, and so forth. For example, the wireless communication interface 106 may be compliant with at least the Bluetooth 4.0 core specification as promulgated by the Bluetooth Special Interest Group.

The magnetometer 108 may comprise one or more devices that are capable of detecting and characterizing a magnetic field. For example, the magnetometer 108 may be able to determine a magnitude, polarity, direction, and so forth, about the magnetic field.

The magnetometer 108 may include one or more elements that are sensitive to magnetic fields. For example, the magnetometer 108 may comprise an array of Hall effect magnetometers, an array of magnetostrictive elements, and so forth. Magnetometers 108 with multiple sensing elements may have the sensing elements arranged along three mutually orthogonal axes. For example, the magnetometer 108 may comprise the MAG3110 3-axis magnetometer from Freescale Semiconductor, Inc. of Austin, Tex., USA. In other implementations, other types of magnetic sensing elements may be used. For example, the magnetometer 108 may comprise a fluxgate magnetometer sensing element.

The portable device 104 may include a data processing module 110. The data processing module 110 may include a processor and memory that stores instructions. When executed, the instructions may process information as described next. For example, a digital signal processor (DSP) may be used to process output from the magnetometer 108. In some implementations, the data processing module 110 may include analog electronic circuitry for data processing.

Device data 112 may be generated by the portable device 104. The device data 112 may include a device identifier 114, magnetometer data 116, beacon data 118, and so forth. The device identifier 114 may comprise information such as a media access control (MAC) address, integrated circuit card identifier (ICCID), serial number, and so forth. The device identifier 114 may be unique or reasonably unique within the universe of portable devices 104.

The magnetometer data 116 comprises information obtained by the magnetometer 108. For example, the magnetometer data 116 may comprise a serialized stream of data produced by three magnetic sensing elements, each associated with a different mutually orthogonal axis. In another example, the magnetometer data 116 may comprise data produced by two or more different types of magnetic sensing elements. The magnetometer data 116 may include timestamp information that is indicative of when the data was acquired from the magnetometer 108.

The data processing module 110 may be used to process raw data from the magnetometer 108. For example, the data processing module 110 may accept as input the raw data that is the serialized readouts of the magnetic sensing elements over time. Using this input, the data processing module 110 may generate field strength values that are filtered, averaged, normalized, differential, and so forth. For example, data processing module 110 may generate data indicative of a change in the detected field strength over a particular period of time. The output from the data processing module 110 may be provided as the magnetometer data 116.

In some implementations, the portable device 104 may receive information from a beacon as described below. The beacon data 118 may comprise information that was transmitted in the beacon, or which is based on the beacon. For example, the beacon data 118 may comprise information obtained from the beacon that has been cryptographically signed.

The portable device 104 may be implemented in a variety of different form factors. For example, the portable device 104 may comprise a fob, name tag, and so forth. In some implementations, the portable device 104 may comprise a smartphone, tablet, or other device. In other implementations, the portable device 104 may be incorporated into protective gear, clothing, shoes, and so forth. The hardware and operation of the portable device 104 is discussed in more detail below.

During a registration process, a portable device 104 is associated with a particular user 102. For example, the user 102 may comprise an employee of the facility, and during intake of the employee, the user 102 is provided with the portable device 104. An entry of the device identifier 114 may be made in a data store that relates the device identifier 114 with a particular user account identifier that is associated with the user 102.

The user 102 approaches a portal 120 with the portable device 104 in their possession. The portal 120 may include one or more elements. For example, the portal 120 may include one or more structures such as walls 122, posts, pillars, decorative elements, and so forth. These structures may be used to direct users 102 through a particular three-dimensional volume that is within the portal 120. For example, the portal 120 may comprise walls 122 that form a passageway through which the user 102 may pass to enter the facility. In some implementations the portal 120 may include gates, arches, and so forth. The portal 120 may be positioned at an entry, exit, or other location within the facility. At least a portion of the elements of the portal 120 may be integrated into other structures. For example, magnets, sensors, or other elements of the portal 120 may be incorporated into a door frame.

In one implementation, a beacon transmitter 124 proximate to the portal 120 transmits beacon data. The beacon transmitter 124 may comprise a Bluetooth Low Energy (BLE) beacon transmitter that periodically emits radio signals, announcing presence of the gate. The portable device 104 detects the beacon data and, responsive to this, may transition from a low power mode to an operational mode.

The beacon data transmitted by the beacon transmitter 124 may include information that may be provided to the portable device 104. For example, the beacon data may include data indicative of a current system time, encrypted data, and so forth.

One or more magnets 126 at the portal 120 produce a magnetic field 128. The magnets 126 may comprise one or more of permanent magnets, electromagnets, or a combination thereof. For example, the magnets 126 may comprise magnets that are made from alloys of rare earth elements, iron, or other materials that produce a persistent magnetic field. In some implementations, the magnetic field 128 may be modulated. For example, permanent magnets may be physically rotated or moved using a motor or other mechanism to produce a specified change in the magnetic field 128 over time within a particular volume. In another example, electromagnets may be driven to produce a time varying signal. For example, the magnet 126 may comprise an electromagnet driven by circuitry to control one or more of voltage, polarity, amperage, generate an alternating current, and so forth. In one implementation, the magnet 126 may comprise an electromagnet that is driven by an alternating current at a particular frequency.

The magnetic field 128 may be configured to provide a particular field strength at particular points for a particular volume within the portal 120. For example, the magnetic field 128 may be configured to provide a magnetic field strength of between 450 and 550 microteslas across the width of a passageway for the user 102 through portal 120. In one implementation, one or more of the magnets 126 may be mounted on one or more support structures that maintain the one or more magnets 126 at a height of between two feet and six feet above the ground. For example, the support structures may comprise vertical members mounted to the floor, ceiling, or affixed to a base that rests on the floor. A plurality of magnets 126 may be arranged along the support structures. For example, a plurality of magnets 126 may be mounted on the support structure with their respective magnetic fields oriented in approximately the same direction. Continuing the example, the north poles of a plurality of bar magnets 126 may all be pointed inward towards the volume of the portal through which the user 102 may pass. The magnets 126 may also be arranged in or underneath the floor, overhead, and so forth. In one implementation, the magnets 126 may be mounted to provide a magnetic field 128 that extends from floor to ceiling.

In some implementations, the magnetic field 128 may be modulated as described above, and provides a particular time varying magnetic field 128 within the particular volume. For example, the magnetic field 128 may be modulated with a 5 Hz signal that is detectable by the magnetometer 108. In this implementation, the determination of presence at the portal 120 is based on the detection of the modulated magnetic field 128.

The portal 120 may include one or more proximity sensors 130. During operation, the proximity sensors 130 generate proximity data 132. The proximity sensors 130 are able to detect the presence of an object at the portal 120. The proximity sensors 130 may utilize optical, ultrasonic, weight, capacitive, or other techniques to determine the presence of an object at the portal 120. Proximity sensors 130 are discussed in more detail below with regard to FIG. 8.

In one implementation, the proximity sensors 130 may comprise an infrared (IR) transmitter on one side of the passageway and an IR receiver on the other. As a user 102 or other object passes through a beam emitted by the IR transmitter, they block the light to IR receiver. Proximity data 132 resulting from this change in light intensity may be generated. The proximity data 132 may include a timestamp indicative of when the proximity data 132 was obtained. In some implementations, proximity data 132 may be obtained only after the detection of an object. For example, detection of an object may result in generation and transmittal of proximity data 132.

The proximity sensor 130 may be situated to reduce detection of objects other than users 102. For example, if the facility utilizes wheeled totes, the beam of the proximity sensor 130 may be located at a height greater than the cart. The cart would pass under the beam without breaking it and triggering a detection event, while the user 102 would trigger a detection event.

A plurality of proximity sensors 130 may be used to determine a direction of movement within the portal 120. For example, a pair of proximity sensors 130 is depicted here, a first proximity sensor 130(1) is positioned before the magnets 126 and a second proximity sensor 130(2) after. By determining that the first proximity sensor 130(1) has detected a user 102 before the second proximity sensor 130(2), the user 102 may be determined to be entering the portal 120.

A computing device 134 is in communication with the proximity sensor 130 and receives the proximity data 132. A wireless communication interface 136 may also be located at the portal 120 and is in communication with the computing device 134.

The wireless communication interface 136 receives the device data 112 transmitted by the portable device 104. For example, the wireless communication interface 136 may be compatible with one or more of Bluetooth, Bluetooth Low Energy (BLE), Wi-Fi, and so forth. The wireless communication interface 136 is able to establish communication with the wireless communication interface 106 of the portable device 104. For example, the wireless communication interface 136 may receive the device data 112. The communication between the portable device 104 and the wireless communication interface 136 may be unidirectional or bidirectional. In some implementations, the portable device 104 may broadcast and the wireless communication interface 136 of the portal 120 may receive the device data 112. In other implementations, a connection may be established between the wireless communication interface 106 of the portable device 104 and the wireless communication interface 136 of the portal 120.

In one implementation, the portable device 104 may transmit an advertisement message using the wireless communication interface 106. The advertisement message may comprise information that is indicative of the presence of the portable device 104. For example, the advertisement message may comprise the device identifier 114. The wireless communication interface 136 at the portal 120 may receive the advertisement message and respond. For example, responsive to the receipt of the advertisement message, the wireless communication interface 136 at the portal 120 may establish a connection with the wireless communication interface 106 of the portable device 104. Responsive to the establishment of the connection, operation of the portable device 104 may change. For example, the portable device 104 may transition from a low power to an operational mode, may begin acquiring magnetometer data 116, may begin transmitting the device data 112, or take other actions.

The portal 120 may include one or more cameras 138. One camera 138 may have a field of view (FOV) that encompasses at least a portion of the portal 120. For example, the FOV may include the area in the passageway that includes the magnetic field 128. The cameras 138 may be located overhead, at oblique angles, and so forth. During operation, the camera 138 may obtain an image of the user 102, establish tracking for a vision-based blob tracking system, and so forth. The camera 138 provides image data 140 to the computing device 134.

The portal 120 may include a gate 142. The gate 142 or other physical access control device restricts entry by the user 102 to the facility. For example, the gate 142 may comprise moving panels, a turnstile, an electronically locked door, and so forth. The computing device 134 may control the operation of the gate 142 as described below.

The computing device 134 may include an analysis module 144 that processes the device data 112 and the proximity data 132. For example, the analysis module 144 may compare the magnetometer data 116 in the device data 112 with expected magnetic field data 146. The expected magnetic field data 146 may comprise information about the magnetic field 128 at a particular time. The expected magnetic field data 146 may be measured using one or more magnetometers 108 at the portal 120, determined during a calibration and setup process, manually input, and so forth. The analysis module 144 may access account data 148. The account data 148 comprises information that relates a particular device identifier 114 to a particular user account, and the user 102 of that account. If the analysis module 144 determines that the portable device 104 is present at the portal 120, the account data 148 may be accessed to determine the user account and thus the user 102 who is at the portal 120. In some implementations, the account data 148 may include limitations on access, such as dates/times that the user 102 is permitted to access the facility, if those permissions have been rescinded, and so forth.

Based on the determination by the analysis module 144, entry data 150 may be generated. The entry data 150 may include information such as a portal identifier indicative of the particular portal 120, date, time, user account identifier, and so forth.

The entry data 150 may be provided to an inventory management system 152. The inventory management system 152 may be configured to maintain information about items, users 102, condition of the facility, and so forth. For example, the inventory management system 152 may maintain data indicative of a number of items at a particular inventory location, what items a particular user 102 is ordered to pick, how many items have been picked or placed at the inventory location by the particular user 102, requests for assistance, environmental status of the facility, and so forth.

The analysis module 144 may use the account data 148 to determine if the user 102 (or their respective user account) is authorized access to the facility. If so, gate control data 154 may be provided that directs the gate 142 to allow open, allowing the user 102 passage. The gate control data 154 may comprise instructions, commands, or other data that operates the gate 142. For example, the gate control data 154 may comprise an "open" command or "close" command.

In some implementations, the identity of the user 102 included in the entry data 150 may be used by a subsequent tracking system. For example, once identified, the user 102 may be tracked using cameras 138 within the facility.

While the terminology and examples given above are discussed in terms of entry to the facility, it is understood that the techniques and systems described are also applicable to exit from the facility. Portals 120 may also be located within the facility. For example, a first portal 120(1) may be positioned at an entrance to the building, while a second portal 120(2) may be located inside the building to identify users 102 at particular points therein.

Figure 2:
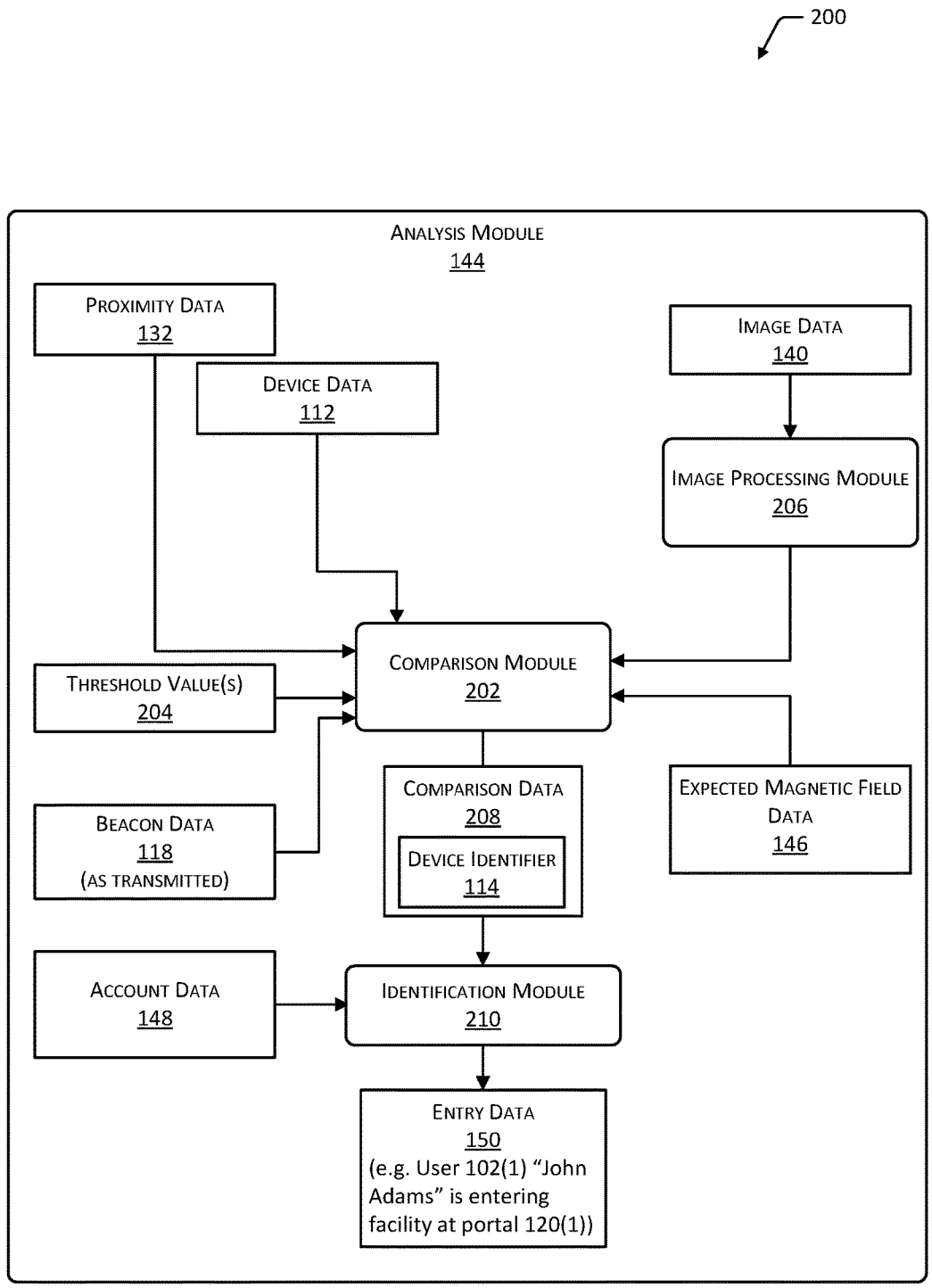
FIG. 2 is a block diagram of an analysis module that can determine entry data which identifies the user at the portal, according to some implementations.

FIG. 2 is a block diagram 200 of the analysis module 144 that can determine entry data 150 which identifies the user 102 at the portal 120, according to some implementations.

The analysis module 144 may include a comparison module 202. The comparison module 202 may access one or more threshold values 204. The threshold values 204 may be indicative of fixed thresholds, dynamic thresholds, threshold values, threshold ranges, and so forth. For example, the threshold values 204 may indicate a minimum differential or change in magnetic field values for a particular period of time. The comparison module 202 may also accept as input information from an image processing module 206.

During operation, the comparison module 202 uses inputs to determine if the portable device 104 is present at the portal 120 at a particular time. The comparison module 202 may determine if the magnetic field as indicated by the magnetometer data 116 is within a threshold value of the expected magnetic field data 146. This may include a comparison of the amplitude or field strength of the magnetic field 128, a comparison in the change over time of the magnetic field as indicated by the magnetometer data 116, and so forth. The comparison module 202 may perform comparisons for data obtained during a specified time of one another. For example, the threshold time may comprise a window that is 1000 milliseconds in duration. Continuing the example, the comparison module 202 may determine a change in magnetic field strength over the course of the window. If the determined change corresponds to the expected magnetic field data 146, the portable device 104 may be deemed to have detected the magnetic field 128. The comparison module 202 may inspect the timestamps associated with the proximity data 132, device data 112, beacon data 118, expected magnetic field data 146, and so forth.

In some implementations, the magnetic field 128 may be time varied and the expected magnetic field data 146 may comprise different values for different times. For example, the magnetic field 128 may be pulsed such that the amplitude changes over time. In this implementation, the timestamp of the magnetometer data 116 may be used to retrieve the expected magnetic field data 146 at that corresponding time for comparison. In another example, the polarity of the magnetic field 128 may be changed from one time to another, with the peak amplitude or field strength being the same or in some implementations changing from one peak to another.

The information such as magnitude, frequency, or polarity of the magnetic field 128 may be used to provide information about whether the portable device 104 is at the portal 120. For example, the magnetometer data 116 may indicate a peak overall magnetic field amplitude of 487 microteslas as measured by the magnetometer 108 of the portable device 104 during the period of time when the portable device 104 was proximate to the portal 120. If the expected magnetic field data 146 is a 500 microtesla field, and the threshold value 204 specifies up to 10% deviation is allowed, the magnetometer data 116 may be deemed to be indicative of the magnetic field 128 at the portal 120.

In another example, the amplitude may be further analyzed to determine a relative change in the magnetic field 128. This relative change may be used instead of, or in addition to, the amplitude data to provide information about whether the portable device 104 is at the portal 120. For example, a differential or change in magnetic field values obtained by the magnetometer 108 indicating a change of 200 microteslas over a 100 millisecond period of time may be deemed to be indicative of the presence of the portable device 104 at the portal 120.

As described above, in some implementations, the magnetic field 128 may be modulated with a particular frequency. For example, the magnet 126 may comprise an electromagnet that is driven by electronics that produce one or more alternating currents (AC) at one or more frequencies. For example, the electromagnet may be driven with AC at 2 Hz and AC at 5 Hz. The comparison module 202 may analyze the magnetometer data 116 to determine if the respective frequencies are present in the data obtained by the magnetometer(s) 108. Continuing the example, the magnets 126 may be driven with a sinusoidal waveform to produce a 5 Hz time-varying magnetic field 128. The magnetometer data 116 may be processed to determine the presence of the 5 Hz sine signal. If the 5 Hz sine signal is present the comparison module 202 may deem the portable device 104 as present in the magnetic field 128. In some implementations, a minimum threshold amplitude may also be used. Continuing the example, presence may be deemed to occur when the 5 Hz signal has a peak amplitude of at least 100 microteslas.

The proximity data 132 may also be used to determine if the portable device 104 is at the portal 120 at about the same time as when the magnetometer data 116 was obtained. In one implementation, if the proximity of an object, such as the user 102, is detected by the proximity sensor 130, proximity data 132 may be generated that indicates the detection and the timestamp of that detection. The comparison module 202 may determine if the timestamp of the detection of the object indicated by the proximity data 132 is within a threshold window of time of the timestamp for the magnetometer data 116 that was indicative of the peak overall magnetic field amplitude. For example, the magnetometer data 116 may indicate a peak of 487 microteslas at timestamp t=1 and the proximity data 132 indicates detection of an object at t=2. If the threshold window of time is up to 2 units of time, then the presence of the portable device 104 may be deemed present at the portal 120.

Other information may be used by the comparison module 202 to determine if the portable device 104 is present at the portal 120 at a particular time. In one implementation, the beacon transmitter 124 may transmit beacon data 118 that varies with time. This beacon data 118 may be received by the portable device 104 and processed. For example, the beacon data 118 as received may be encrypted, and the encrypted value included in the device data 112. The comparison module 202 may decrypt the value, and confirm that the beacon data 118 as transmitted matches the beacon data 118 that was returned by the portable device 104.

In another implementation, the image data 140 from the camera 138 at the portal 120 may be processed using an image processing module 206. The image processing module 206 may determine if a person is depicted in the image data 140, if the portable device 104 is depicted in the image data 140, and so forth. For example, the image processing module 206 may use a classifier or artificial neural network to determine if a face is present in the image data 140. In this example, the presence of a face in image data 140 that was acquired within a threshold window of time as the magnetometer data 116 that corresponds to the expected magnetic field data 146, may be used to determine the presence of the portable device 104 at the portal 120.

The comparison module 202 generates comparison data 208. The comparison data 208 indicates that a particular device identifier 114 has been deemed to be present at the portal 120. As described above, the device data 112 includes the device identifier 114 of the portable device 104. In other implementations instead of, or in addition to, the device identifier 114, other identifier data may be provided. For example, a user identifier may be transmitted by the portable device 104.

The comparison data 208 is accessed by an identification module 210. The identification module 210 accesses account data 148. The account data 148 provides information that associates a particular device identifier 114 with a particular account. For example, the MAC address 74:72:6f:70:69:63 of the portable device 104 that sent the device data 112 may be used to query a data store of the account data 148. The query may return a result of the account identifier 3032674905 that identifies the account of user "John Adams".

The identification module 210 may generate corresponding entry data 150 that indicates the portable device 104 associated with the particular account has been detected at the portal 120. In some implementations, it may be assumed that the portable device 104 is being carried by the user 102 associated with the particular account.

Figure 3:
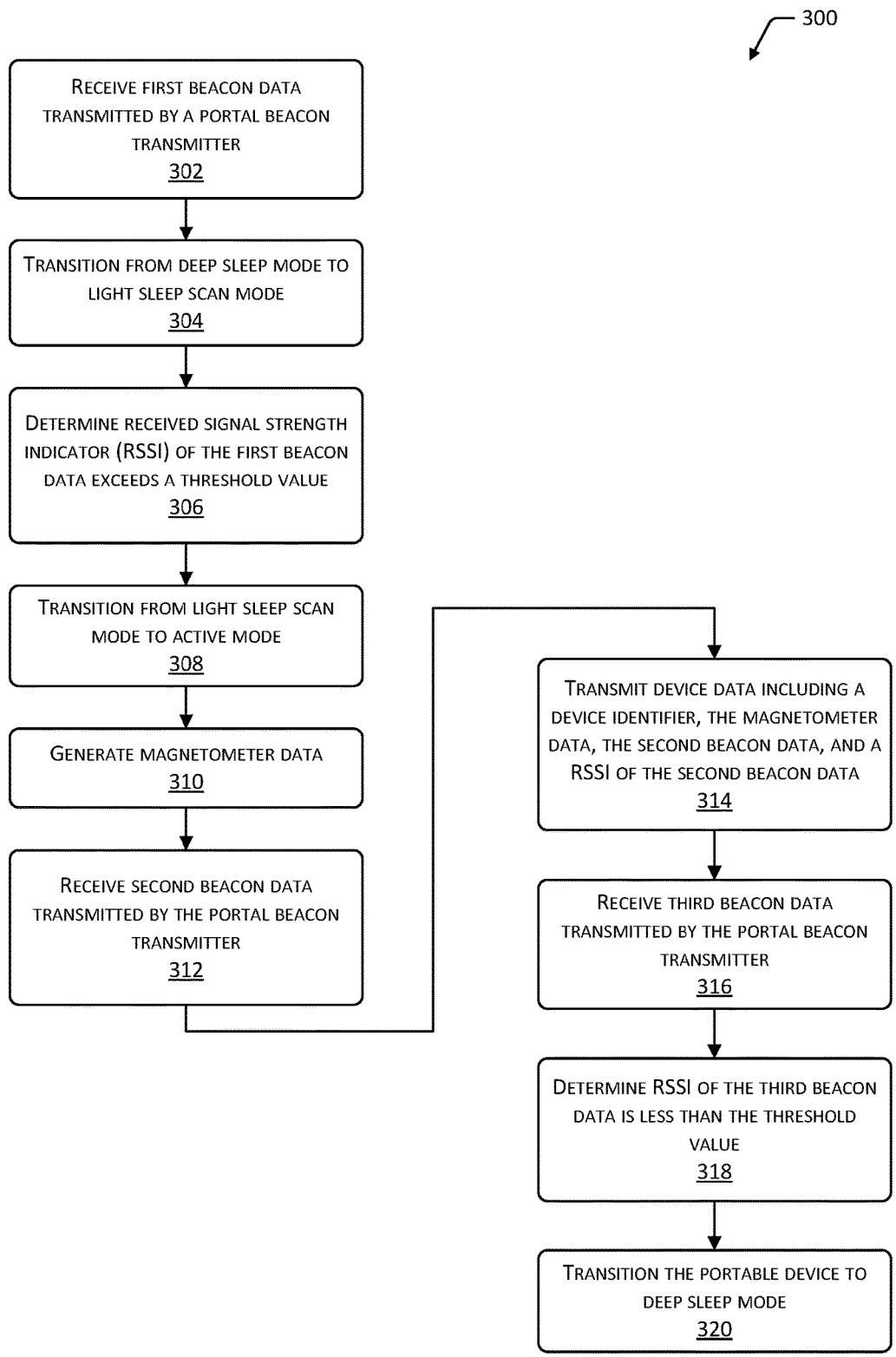
FIG. 3 depicts a flow diagram of a process by a portable device that interacts with the portal to facilitate identification of a user, according to some implementations.

FIG. 3 depicts a flow diagram 300 of a process by a portable device 104 that interacts with the portal 120 to facilitate identification, according to some implementations. The process may be implemented at least in part by the system 100.

At 302, first beacon data 118(1) as transmitted by the beacon transmitter 124 at the portal 120 is received by the portable device 104. The first beacon data 118(1) may comprise timestamp data, a randomly generated value, a sequence number, and so forth. In some implementations, the beacon data 118 may be encrypted. For example, while in a deep sleep mode, the wireless communication interface 106 of the portable device 104 may periodically activate the receiver to detect signals such as the beacon data 118.

At 304, the portable device 104 transitions one or more components from a low power mode to an operational mode. The low power mode consumes less electrical power than the operational mode. For example, the portable device 104 may transition the wireless communication interface 106 of the portable device 104 from a deep sleep mode to a light sleep scan mode. In the light sleep scan mode, the wireless communication interface 106 may be operational more frequently, for longer spans of time, additional functions may be available, and so forth, as compared to the deep sleep mode.

At 306, a received signal strength indicator (RSSI) of the first beacon data 118(1) is determined to exceed a threshold value. The RSSI may be provided by the wireless communication interface 106. For example, the receiver in the wireless communication interface 106 may generate the RSSI data. In other implementations, other metrics about the signal strength of the received signal may be obtained and used instead of, or in addition to, RSSI. For example, the received channel power indicator (RCPI) may be determined. The comparison of the RSSI to the threshold value may be used to determine if the portable device 104 is nearby the portal 120.

At 308, the portable device 104 may transition one or more components from a low power mode to a higher power mode that provides more functionality, such as a fully operational mode. In one implementation, the portable device 104 may transition from a light sleep scan mode to an active mode. For example, the RSSI of the message that conveyed the first beacon data 118(1) may have an RSSI of 79. The threshold value may be 60. Responsive to the RSSI being greater than the threshold value, the portable device 104 wakes up to a fully operational state that may include powering up the magnetometer 108. For example, as the portable device 104 nears the portal 120 and the beacon transmitter 124, the RSSI increases.

At 310, the magnetometer 108, now in the fully operational state, generates the magnetometer data 116. The magnetometer 108 may produce a series of magnetic field measurements acquired at subsequent times.

At 312, second beacon data 118(2) as transmitted by the beacon transmitter 124 of the portal 120 is received by the portable device 104. In some implementations, this step may be omitted, and subsequent steps may use the first beacon data 118(1).

At 314, the portable device 104 transmits the device data 112. As described above, the device data 112 may include a device identifier 114 and the magnetometer data 116. In some implementations, one or more other data elements may be included in the device data 112, such as the RSSI of the beacon data 118, the beacon data 118 as received, or information based on the beacon data 118. For example, the comparison module 202 may disregard device data 112 that exhibits an RSSI that is below a threshold value. In other implementations instead of, or in addition to, the device identifier 114, other identifier data may be provided. For example, a user identifier may be transmitted by the portable device 104.

At 316, third beacon data 118(3) as transmitted by the beacon transmitter 124 of the portal 120 is received by the portable device 104.

At 318, the RSSI of the third beacon data 118(3) is determined to be less than the threshold value. At 320, the portable device 104 transitions one or more components of the portable device 104 to the low power mode. For example, the wireless communication interface 106 may transition to the deep sleep mode, the magnetometer 108 may be turned off, and so forth.

By using these and other techniques, power consumption of the portable device 104 may be reduced, allowing for an extended service life without battery changes or charging. For example, when the power supply comprises a coin cell, using these techniques allows the portable device 104 to operate for months or years.

In some implementations, the portable device 104 may be configured to transmit data periodically and listen for a response, prior to transitioning one or more components to an operational mode. For example, the wireless communication interface 106 may be compliant with at least a portion of the Bluetooth Low Energy (BLE) specification and may transmit a BLE advertising message every 5 seconds.

Figure 4:
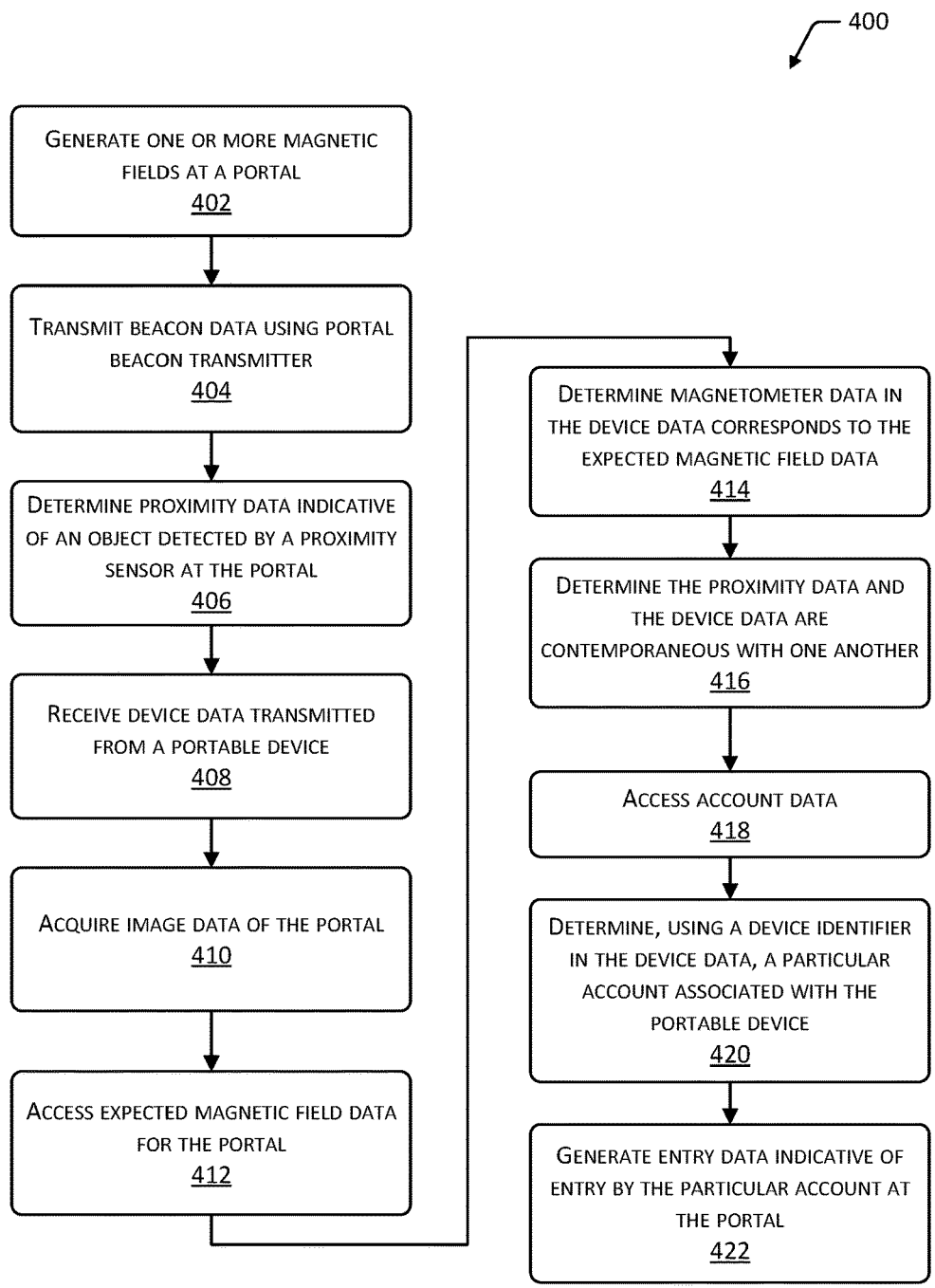
FIG. 4 depicts a flow diagram of a process for identifying a user at the portal to facilitate identification of a user, according to some implementations.

FIG. 4 depicts a flow diagram 400 of a process for identifying a user 102 at the portal 120 to facilitate identification, according to some implementations. The process may be implemented at least in part by the system 100.

At 402, one or more magnetic fields 128 are generated at the portal 120. For example, permanent magnets 126 may be held in place around a passageway through the portal 120 within a non-ferrous structure such as plastic, wood, aluminum, and so forth.

At 404, beacon data 118 is transmitted using the portal beacon transmitter 124. For example, a BLE beacon may be transmitted using a BLE transmitter.

At 406, proximity data 132 is determined that is indicative of an object detected by a proximity sensor 130. The proximity sensor 130 is located at the portal 120, such as adjacent to the magnets 126. The proximity sensor 130 is thus able to determine the presence of an object, such as the user 102, as the object is at least partially within the magnetic field 128.

At 408, the device data 112 as transmitted by the portable device 104 is received by the wireless communication interface 136 at the portal 120. In some implementations, the beacon transmitter 124 and the wireless communication interface 136 may be the same device, or share one or more components.

At 410, image data 140 of the portal 120 or a portion thereof may be acquired. For example, the FOV of the camera 138 may be configured to acquire an image of the user's 102 head during typical passage through the portal 120. The image data 140 may be obtained either responsive to the presence of the user 102, or may be continuously obtained and a particular set of the image data 140 may be used based on a timestamp. For example, the entry data 150 may indicate the passage of the user 102 through the portal 120 at a first timestamp value. The corresponding image data 140 obtained having a second timestamp value that is the same or within a threshold time of the first timestamp value may be retrieved and associated with the user 102. This image data 140 may be used for subsequent tracking, authentication, auditing, and so forth.

At 412, the expected magnetic field data 146 is accessed. For example, if the magnetic field 128 is static, the data may be obtained from a data store. In another example, one or more magnetometers may be emplaced within the magnetic field 128 to gather field strength data that may then be used to calculate the expected magnetic field data.

At 414, the magnetometer data 116 in the device data 112 is determined to correspond to the expected magnetic field data 146. For example, the total magnetic field strength as determined from the magnetometer data 116 may be within a threshold value of the value indicated by the expected magnetic field data 146.

At 416, the proximity data 132 and the device data 112 are determined to be contemporaneous with one another. For example, the proximity data 132 and the device data 112 may have timestamps that are within a threshold time of one another.

At 418, account data 148 is accessed. At 420, an account identifier or other information indicative of an identity of the user 102 is determined using the device identifier 114. For example, a data store may be queried with the device identifier 114 and returns results indicating a user account identifier or other user account information that is associated with that device identifier 114.

At 422, the entry data 150 is generated that is indicative of entry by the particular account at the portal 120.

Figure 5:
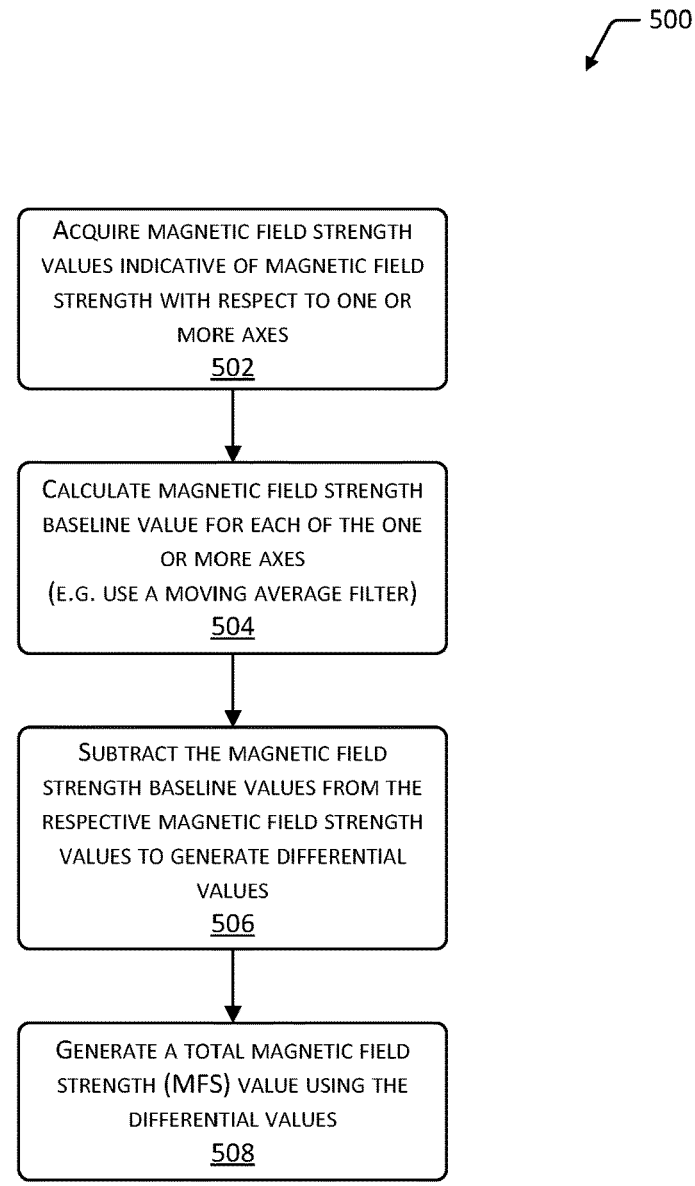
FIG. 5 depicts a flow diagram of a process for calibrating a magnetometer to address residual magnetism, according to some implementations.

FIG. 5 depicts a flow diagram 500 of a process for calibrating a magnetometer 108, according to some implementations. The sensing elements of some magnetometers 108 may be prone to being temporarily magnetized when in the presence of strong local magnetic fields. As a result, the output may be less accurate.

At 502, magnetic field strength (MFS) values are acquired over time for the sensing elements. For example, a 3 axis magnetometer 108 may provide as output MFS values for an X, Y, and Z axis from three different sensing elements.

At 504, a MFS baseline value is calculated for each of the sensing elements. For example, a MFS baseline value may be determined for each of the X, Y, and Z axis sensing elements.

A moving average filter or exponentially weighted moving average function may be used to calculate the MFS baseline value for each of the sensing elements. For example:

$$y(i)=\alpha y(i-1)+(1-a)*x(i) \quad \text{Equation 1}$$

For equation 1, y is the output of the filter, x is the MFS value, and a determines how many prior samples of the MFS value will be used to calculate the baseline. The baseline may be calculated for each of the sensing elements using the MFS values from the respective sensing element.

At 506, the MFS baseline values are subtracted from the respective MFS values to generate differential values. For example, the baseline values may then be subtracted from the MFS values of the respective sensing elements.

At 508 a total MFS is determined using the differential values. For example, the total MFS may comprise a value that is a sum of the absolute values of differences between the raw magnetic field strength values and the baseline values.

Continuing the example with the 3 axis magnetometer 108, with axes x, y, z:

$$\text{Total MFS}=|MFSx-\text{Baseline}MFSx|+|MFSy-\text{Baseline}MFSy|+|MFSz-\text{Baseline}MFSz| \quad \text{Equation 2}$$

Figure 6:
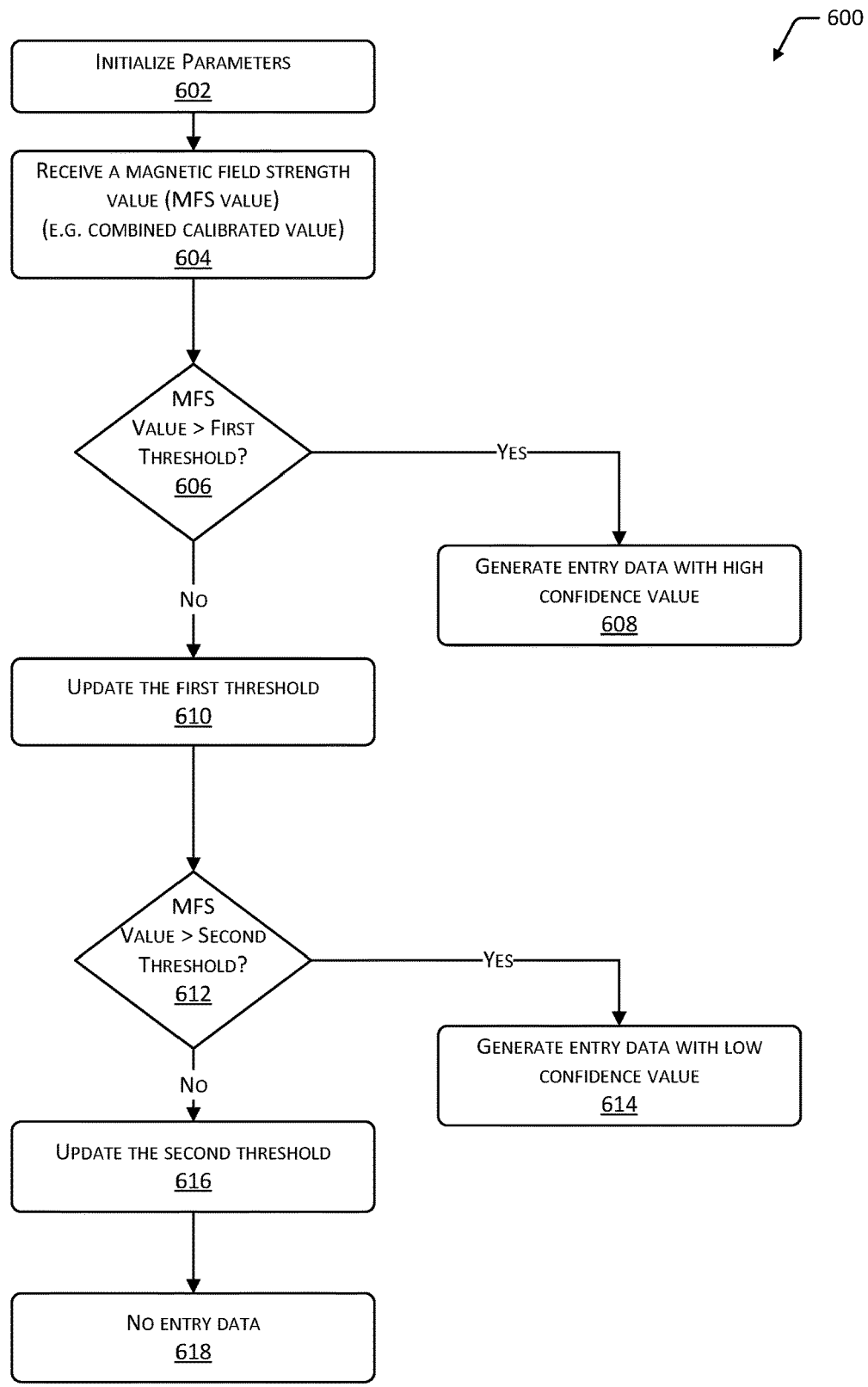
FIG. 6 depicts a flow diagram of a process for an adaptive differential detection of the magnetic field at the portal, according to some implementations.

FIG. 6 depicts a flow diagram 600 of a process for an adaptive differential detection of the magnetic field 128 at the portal 120, according to some implementations. In some situations, the values of the magnetic fields 128 reported by the magnetometer 108 or sensing elements therein may vary over time. For example, exposure to a strong magnetic field 128 may result in the sensing elements being magnetized for some time. In another example, another source of a magnetic field 128 may be present, such as in the speaker magnets of a smartphone that is near the portable device 104. The process described allows for the determination of whether a magnetic field 128 has been detected with a high confidence, low confidence, or not at all. A high confidence determination indicates a strong likelihood that the magnetic field 128 as detected is associated with the portal 120. A low confidence determination indicates that the magnetic field 128 detected may be associated with the portal 120, but is not deemed to be definitive. As described next, multiple thresholds may be used, and the threshold may be adjusted over time to deal with time varying changes in the magnetic fields 128 detected by the magnetometer 108.

At 602, one or more parameters are initialized. These parameters may include a first threshold, a second threshold, $B_1$ and M1, and so forth.

At 604, one or more magnetic field strength (MFS) values are received. For example, the process of FIG. 5 may be used to generate one or more of the total MFS values that are used by this process. In other implementations, other techniques may be used. For example, each of the total MFS values may comprise a sum of the MFS values obtained during a particular interval of time by one or more sensing elements of the magnetometer 108. Magnetometer data 116 obtained during a first interval of time may be used to produce the one or more MFS values. For example, the first interval may be 1000 ms long.

At 606, the one or more MFS values are assessed to determine if they exceed a first threshold value. In some implementations this may include determining a differential between the first and last MFS values, determining a maximum MFS value, determining a minimum MFS value, and so forth. If the one or more MFS values exceed the first threshold value, the process proceeds to 608. At 608, entry data 150 is generated with a high confidence value that is representative of a high likelihood that the magnetic field 128 has been detected by the magnetometer 108. The process may then continue on to further perform other processing or initiate other actions. For example, given the determination that the magnetic field 128 was detected, the gate 142 may be opened.

In one implementation, the process may continue to identify a user for a vision-based tracking system in the facility. The image data 140 obtained at the time corresponding to the entry may be associated with the account data 148 for the entry event. For example, as the user 102 passes through the portal 120, the camera 138 obtains image data 140 of that user. An image-based blob tracking system may then associate the "blob" that is the user 102 as they appear within the image data 140 at the time of entry, with the particular account data 148, such as a user identifier. The "blob" is now associated with a particular account, identifier, or other information that may be used to identify or distinguish the user 102 from others. As the user 102 moves about the facility, the image-based blob tracking system may provide tracking data indicative of their location within the facility.

Returning to 606, if the one or more MFS values in the first interval is less than or equal to the first threshold, the process proceeds to 610. At 610, the first threshold is updated. For example, the following equation may be used to update the first threshold:

$$\text{First Threshold}(i) = B_1 + \frac{\sum_{k=i-M1}^{i-1} MagneticFieldStrength(k)}{M1} \quad \text{Equation 3}$$

For equation 3, $B_1$ and M1 may comprise pre-determined values. For example, each portal 120 may have a different physical configuration that results in different values of $B_1$ or M1. In some implementations, these values may be determined during a calibration or testing phase of the portal 120. For example, the calibration may include a user 102 passing through the portal 120 multiple times with the portable device 104, with the $B_1$ and $M_1$ values being adjusted until the entry data 150 determined is deemed acceptable.

The update of the first threshold may be used for subsequent comparisons. As a result, over time the first threshold may change. This allows the system to adapt over time to changes in the environment, the magnetic field 128, magnetometer 108, and so forth.

The process may then proceed to 612. At 612, the one or more MFS values are assessed to determine if they exceed a second threshold value. In one implementation, the one or more MFS values used in this analysis may be expanded. The magnetometer data 116 obtained during a second interval of time may be used to produce the one or more MFS values. For example, the second interval of time may be 10,000 milliseconds. In some implementations, the second interval of time may include or overlap in time with the first interval of time. If the one or more MFS values are determined to exceed the second threshold value, the process proceeds to 614. At 614, entry data 150 is generated with a low confidence value that is representative of a low likelihood that the magnetic field 128 has been detected by the magnetometer 108. The process may then continue on to further perform other processing or initiate other actions. For example, given the determination that the magnetic field 128 was detected, the gate 142 may be opened.

In one implementation, the process may continue to identify a user for a vision-based tracking system in the facility. The image data 140 obtained at the time corresponding to the entry may be associated with the account data 148 for the entry event. For example, as the user 102 passes through the portal 120, the camera 138 obtains image data 140 of that user. An image-based blob tracking system may then associate the "blob" that is the user 102 as they appear within the image data 140 at the time of entry, with the particular account data 148, such as a user identifier. The "blob" is now associated with a particular account, identifier, or other information that may be used to identify or distinguish the user 102 from others. As the user 102 moves about the facility, the image-based blob tracking system may provide tracking data indicative of their location within the facility.

Returning to 612, if the one or more MFS values are less than or equal to the second threshold, the process proceeds to 616. At 616, the second threshold is updated. For example, the following equation may be used to update the second threshold:

$$\text{Second Threshold}(i) = B_2 + \frac{\sum_{k=i-M2}^{i-1} MagneticFieldStrength(k)}{M2} \quad \text{Equation 4}$$

For equation 4, $B_2$ and M2 may comprise pre-determined values. Similar to the first threshold, this update to the second threshold allows the second threshold to change over time. $B_1$ and $B_2$ may be the same or different values. For example, $B_1$ may have a value of 100 and $B_2$ may have a value of 150. $M_1$ and $M_2$ may be the same or different values. For example, $M_1$ may have a value of 120 and $M_2$ may have a value of 180.

The process may then proceed to 618 which results in either no entry data being generated, or in the generation of entry data 150 that is indicative of a null detection or a negative detection. For example, the null detection may comprise entry data 150 that specifies "no entry detected" for a particular time.

Figure 7:
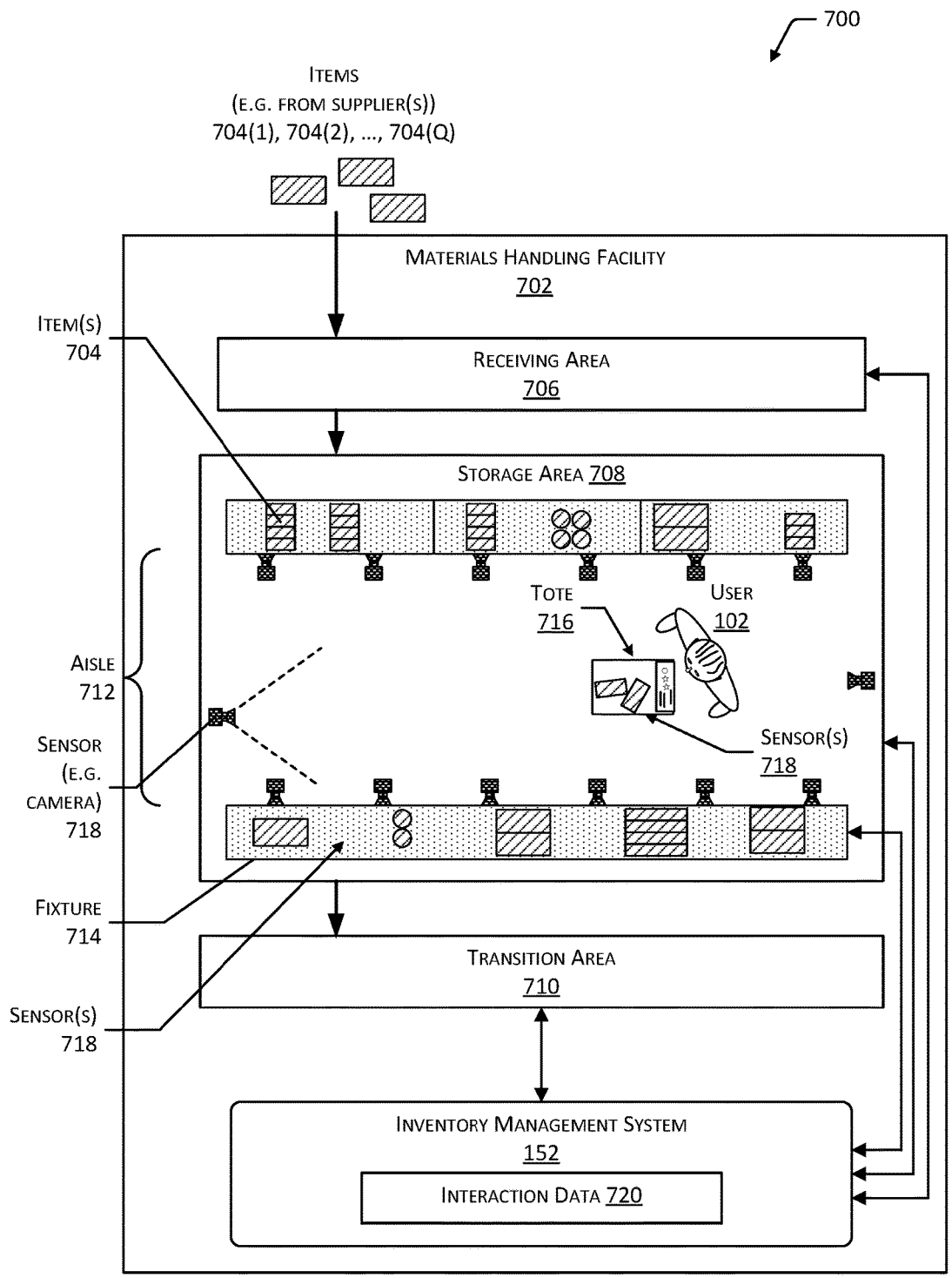
FIG. 7 is a block diagram of a materials handling facility (facility), according to some implementations.

FIG. 7 is a block diagram 700 illustrating a materials handling facility (facility) 702 using the system 100, according to some implementations. A facility 702 comprises one or more physical structures or areas within which one or more items 704(1), 704(2), . . . , 704(Q) may be held. As used herein, a letter within parenthesis such as "(Q)" may indicate a positive integer number. The items 704 may comprise physical goods, such as books, pharmaceuticals, repair parts, electronic gear, and so forth.

The facility 702 may include one or more areas designated for different functions with regard to inventory handling. In this illustration, the facility 702 includes a receiving area 706, a storage area 708, and a transition area 710.

The receiving area 706 may be configured to accept items 704, such as from suppliers, for intake into the facility 702. For example, the receiving area 706 may include a loading dock at which trucks or other freight conveyances unload the items 704. In some implementations, the items 704 may be processed, such as at the receiving area 706, to generate at least a portion of item data.

The storage area 708 is configured to store the items 704. The storage area 708 may be arranged in various physical configurations. In one implementation, the storage area 708 may include one or more aisles 712. The aisle 712 may be configured with, or defined by, fixtures 714 on one or both sides of the aisle 712. The fixtures 714 may include one or more of a shelf, a rack, a case, a cabinet, a bin, a floor location, or other suitable storage mechanisms for holding, supporting, or storing the items 704. For example, the fixtures 714 may comprise shelves with lanes designated therein. The fixtures 714 may be affixed to the floor or another portion of the structure of the facility 702. The fixtures 714 may also be movable such that the arrangements of aisles 712 may be reconfigurable. In some implementations, the fixtures 714 may be configured to move independently of an outside operator. For example, the fixtures 714 may comprise a rack with a power source and a motor, operable by a computing device to allow the rack to move from one location within the facility 702 to another.

One or more users 102(1), 102(2), . . . , 102(U) and totes 716(1), 716(2), . . . , 716(T) or other material handling apparatus may move within the facility 702. For example, the user 102 may move about within the facility 702 to pick or place the items 704 in various fixtures 714, placing them on the tote 716 for ease of transport. The tote 716 is configured to carry or otherwise transport one or more items 704. For example, the tote 716 may include a basket, cart, bag, bin, and so forth. In other implementations, other material handling apparatuses such as robots, forklifts, cranes, aerial drones, and so forth, may move about the facility 702 picking, placing, or otherwise moving the items 704. For example, a robot may pick an item 704 from a first fixture 714(1) and move the item 704 to a second fixture 714(2).

One or more sensors 718 may be configured to acquire information in the facility 702. The sensors 718 may include, but are not limited to, weight sensors 718(1), capacitive sensors 718(2), image sensors 718(3), depth sensors 718(4), and so forth. The weight sensors 718(1) may comprise the same or different hardware as the weight sensors 718(1) described herein. The sensors 718 may be stationary or mobile, relative to the facility 702. For example, the fixtures 714 may contain weight sensors 718(1) to acquire weight sensor data of items 704 stowed therein, image sensors 718(3) to acquire images of picking or placement of items 704 on shelves, optical sensor arrays 718(14) to detect shadows of the user's 102 hands at the fixtures 714, and so forth. In another example, the facility 702 may include image sensors 718(3) to obtain images of the user 102 or other objects in the facility 702. The sensors 718 are discussed in more detail below with regard to FIG. 8.

While the storage area 708 is depicted as having one or more aisles 712, fixtures 714 storing the items 704, sensors 718, and so forth, it is understood that the receiving area 706, the transition area 710, or other areas of the facility 702 may be similarly equipped. Furthermore, the arrangement of the various areas within the facility 702 is depicted functionally rather than schematically. For example, in some implementations, multiple different receiving areas 706, storage areas 708, and transition areas 710 may be interspersed rather than segregated in the facility 702.

The facility 702 may include, or be coupled to, the inventory management system 152. The inventory management system 152 is configured to interact with one or more of the users 102 or devices such as sensors 718, robots, material handling equipment, computing devices, and so forth, in one or more of the receiving area 706, the storage area 708, or the transition area 710.

During operation of the facility 702, the sensors 718 may be configured to provide sensor data, or information based on the sensor data, to the inventory management system 152. The sensor data may include weight data, capacitance data, image data, and so forth.

The inventory management system 152 or other systems may use the sensor data to track the location of objects within the facility 702, movement of the objects, or provide other functionality. Objects may include, but are not limited to, items 704, users 102, totes 716, and so forth. For example, a series of images acquired by the image sensor 718(3) may indicate removal by the user 102 of an item 704 from a particular location on the fixture 714 and placement of the item 704 on or at least partially within the tote 716.

The facility 702 may be configured to receive different kinds of items 704 from various suppliers and to store them until a customer orders or retrieves one or more of the items 704. A general flow of items 704 through the facility 702 is indicated by the arrows of FIG. 7. Specifically, as illustrated in this example, items 704 may be received from one or more suppliers, such as manufacturers, distributors, wholesalers, and so forth, at the receiving area 706. In various implementations, the items 704 may include merchandise, commodities, perishables, or any suitable type of item 704, depending on the nature of the enterprise that operates the facility 702.

Upon being received from a supplier at the receiving area 706, the items 704 may be prepared for storage in the storage area 708. For example, in some implementations, items 704 may be unpacked or otherwise rearranged. The inventory management system 152 may include one or more software applications executing on a computer system to provide inventory management functions. These inventory management functions may include maintaining information indicative of the type, quantity, condition, cost, location, weight, or any other suitable parameters with respect to the items 704. The items 704 may be stocked, managed, or dispensed in terms of countable units, individual units, or multiple units, such as packages, cartons, crates, pallets, or other suitable aggregations. Alternatively, some items 704, such as bulk products, commodities, and so forth, may be stored in continuous or arbitrarily divisible amounts that may not be inherently organized into countable units. Such items 704 may be managed in terms of a measurable quantity such as units of length, area, volume, weight, time, duration, or other dimensional properties characterized by units of measurement. Generally speaking, a quantity of an item 704 may refer to either a countable number of individual or aggregate units of an item 704 or a measurable amount of an item 704, as appropriate.

After arriving through the receiving area 706, items 704 may be stored within the storage area 708. In some implementations, like items 704 may be stored or displayed together in the fixtures 714 such as in bins, on shelves, hanging from pegboards, and so forth. For example, all items 704 of a given kind are stored in one fixture 714. In other implementations, like items 704 may be stored in different the fixtures 714. For example, to optimize retrieval of certain items 704 having frequent turnover within a large physical facility 702, those items 704 may be stored in several different fixtures 714 to reduce congestion that might occur at a single fixture 714.

When a customer order specifying one or more items 704 is received, or as a user 102 progresses through the facility 702, the corresponding items 704 may be selected or "picked" from the fixtures 714 containing those items 704. In various implementations, item picking may range from manual to completely automated picking. For example, in one implementation, a user 102 may have a list of items 704 they desire and may progress through the facility 702 picking items 704 from fixtures 714 within the storage area 708 and placing those items 704 into a tote 716. In other implementations, employees of the facility 702 may pick items 704 using written or electronic pick lists derived from customer orders. These picked items 704 may be placed into the tote 716 as the employee progresses through the facility 702.

After items 704 have been picked, the items 704 may be processed at a transition area 710. The transition area 710 may be any designated area within the facility 702 where items 704 are transitioned from one location to another or from one entity to another. For example, the transition area 710 may be a packing station within the facility 702. When the item 704 arrives at the transition area 710, the item 704 may be transitioned from the storage area 708 to the packing station. Information about the transition may be maintained by the inventory management system 152.

In another example, if the items 704 are departing the facility 702, a list of the items 704 may be obtained and used by the inventory management system 152 to transition responsibility for, or custody of, the items 704 from the facility 702 to another entity. For example, a carrier may accept the items 704 for transport with that carrier accepting responsibility for the items 704 indicated in the list. In another example, a user 102 may purchase or rent the items 704 and remove the items 704 from the facility 702. During use of the facility 702, the user 102 may move about the facility 702 to perform various tasks, such as picking or placing the items 704 in the fixtures 714.

The inventory management system 152 may generate interaction data 720. The interaction data 720 may be based at least in part on data from one or more sensors 718. The interaction data 720 may provide information about an interaction, such as a pick of an item 704 from the fixture 714, a place of an item 704 to the fixture 714, a touch made to an item 704 at the fixture 714, a gesture associated with an item 704 at the fixture 714, and so forth. The interaction data 720 may include one or more of the type of interaction, duration of interaction, interaction location identifier indicative of where from the fixture 714 the interaction took place, item identifier, quantity change to the item 704, user identifier, and so forth. The interaction data 720 may then be used to further update the item data. For example, the quantity of items 704 on hand at a particular lane on the shelf may be changed based on an interaction that picks or places one or more items 704.

The inventory management system 152 may combine or otherwise utilize data from different sensors 718 of different types. For example, weight data obtained from weight sensors 718(1) at the fixture 714 may be used instead of, or in conjunction with, one or more of the capacitance data to determine the interaction data 720.

Figure 8:
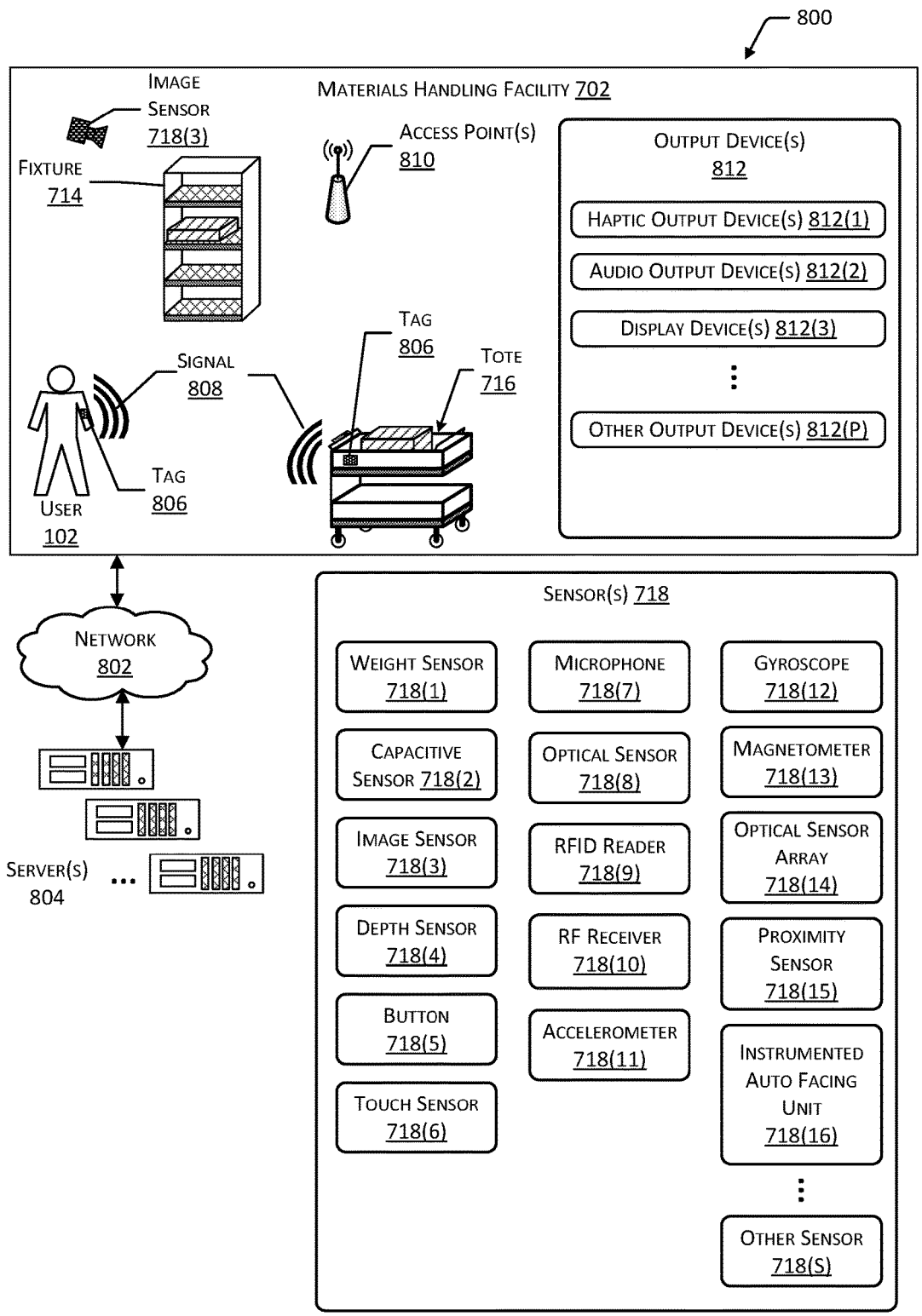
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more servers 804. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite, and so forth), or other connection technologies.

The servers 804 may be configured to execute one or more modules or software applications associated with the inventory management system 152 or other systems. While the servers 804 are illustrated as being in a location outside of the facility 702, in other implementations, at least a portion of the servers 804 may be located at the facility 702. The servers 804 are discussed in more detail below with regard to FIG. 9.

The users 102, the totes 716, or other objects in the facility 702 may be equipped with one or more tags 806. The tags 806 may be configured to emit a signal 808. In one implementation, the tag 806 may be a RFID tag 806 configured to emit a RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence of the tag 806. For example, an acoustic tag 806 may be configured to generate an ultrasonic signal 808, which is detected by corresponding acoustic receivers. In yet another implementation, the tag 806 may be configured to emit an optical signal 808.

The inventory management system 152 may be configured to use the tags 806 for one or more of identification of the object, determining a location of the object, and so forth. For example, the users 102 may wear tags 806, the totes 716 may have tags 806 affixed, and so forth, which may be read and, based at least in part on signal strength, used to determine identity and location. In some implementations, the tags 806 and the portable device 104 may be combined. For example, the portable device 104 may include an RFID device, such as the RFID tag 806.

Generally, the inventory management system 152 or other systems associated with the facility 702 may include any number and combination of input components, output components, and servers 804.

The one or more sensors 718 may be arranged at one or more locations within the facility 702. For example, the sensors 718 may be mounted on or within a floor, wall, at a ceiling, at a fixture 714, on a tote 716, may be carried or worn by a user 102, and so forth.

The sensors 718 may include one or more weight sensors 718(1) that are configured to measure the weight of a load, such as the item 704, the tote 716, or other objects. The weight sensors 718(1) may be configured to measure the weight of the load at one or more of the fixtures 714, the tote 716, on the floor of the facility 702, and so forth. For example, the shelf may include a plurality of lanes or platforms, with one or more weight sensors 718(1) beneath each one to provide weight sensor data about an individual lane or platform. The weight sensors 718(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 718(1) may operate as transducers that generate one or more signals based on an applied force, such as that of the load due to gravity. For example, the weight sensor 718(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 718(1) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 152 may use the data acquired by the weight sensors 718(1) to identify an object, determine a change in the quantity of objects, determine a location of an object, maintain shipping records, and so forth.

The sensors 718 may include capacitive sensors 718(2). The capacitive sensor 718(2) may comprise one or more conductive elements and a capacitance measurement module. The capacitive sensor 718(2) may be configured to use a far-field capacitance effect that may comprise measuring the self-capacitance of the conductive elements, rather than a mutual capacitance. In one implementation, a fixed charge may be provided to the conductive element, and the resultant voltage may be measured between the conductive element and the ground.

In other implementations, the capacitive sensor 718(2) may be configured to operate in a mutual capacitance mode, surface capacitance mode, and so forth. In mutual capacitance mode, at least two conductive layers are arranged in a stack with a dielectric material between the layers. The dielectric material may be a solid, such as a plastic, a gas such as air, a vacuum, and so forth. The mutual capacitance at points between these layers is measured. When another object touches the outermost conductive layer, the mutual capacitance between the two layers changes, allowing for detection. In surface capacitance mode, voltages are applied to different points of a conductive element to produce an electrostatic field. By measuring the changes in current draw (or another electrical characteristic) from the different points at which voltage is applied, a location of an object may be determined.

The sensors 718 may include one or more image sensors 718(3). The one or more image sensors 718(3) may include imaging sensors configured to acquire images of a scene. The image sensors 718(3) are configured to detect light in one or more wavelengths including, but not limited to, terahertz, infrared, visible, ultraviolet, and so forth. The image sensors 718(3) may comprise charge coupled devices (CCD), complementary metal oxide semiconductor (CMOS) devices, microbolometers, and so forth. The inventory management system 152 may use image data 140 acquired by the image sensors 718(3) during operation of the facility 702. For example, the inventory management system 152 may identify items 704, users 102, totes 716, and so forth, based at least in part on their appearance within the image data 140 acquired by the image sensors 718(3). The image sensors 718(3) may be mounted in various locations within the facility 702. For example, image sensors 718(3) may be mounted overhead, on the fixtures 714, at the portals 120, may be worn or carried by users 102, may be affixed to totes 716, and so forth.

One or more depth sensors 718(4) may also be included in the sensors 718. The depth sensors 718(4) are configured to acquire spatial or three-dimensional (3D) data, such as depth information, about objects within a FOV. The depth sensors 718(4) may include range cameras, lidar systems, sonar systems, radar systems, structured light systems, stereo vision systems, optical interferometry systems, and so forth. The inventory management system 152 may use the 3D data acquired by the depth sensors 718(4) to identify objects, determine a location of an object in 3D real space, and so forth.

One or more buttons 718(5) may be configured to accept input from the user 102. The buttons 718(5) may comprise mechanical, capacitive, optical, or other mechanisms. For example, the buttons 718(5) may comprise mechanical switches configured to accept an applied force from a touch of the user 102 to generate an input signal. The inventory management system 152 may use data from the buttons 718(5) to receive information from the user 102. For example, the tote 716 may be configured with a button 718(5) to accept input from the user 102 and send information indicative of the input to the inventory management system 152.

The sensors 718 may include one or more touch sensors 718(6). The touch sensors 718(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 152 may use data from the touch sensors 718(6) to receive information from the user 102. For example, the touch sensor 718(6) may be integrated with the tote 716 to provide a touchscreen with which the user 102 may select from a menu one or more particular items 704 for picking, enter a manual count of items 704 at fixture 714, and so forth.

One or more microphones 718(7) may be configured to acquire information indicative of sound present in the environment. In some implementations, arrays of microphones 718(7) may be used. These arrays may implement beamforming techniques to provide for directionality of gain. The inventory management system 152 may use the one or more microphones 718(7) to acquire information from acoustic tags 806, accept voice input from the users 102, determine ambient noise level, and so forth.

The sensors 718 may include one or more optical sensors 718(8). The optical sensors 718(8) may be configured to provide data indicative of one or more of color or intensity of light impinging thereupon. For example, the optical sensor 718(8) may comprise a photodiode and associated circuitry configured to generate a signal or data indicative of an incident flux of photons. As described below, the optical sensor array 718(14) may comprise a plurality of the optical sensors 718(8). For example, the optical sensor array 718(14) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 718(8) may be used. The optical sensors 718(8) may be sensitive to one or more of infrared light, visible light, or ultraviolet light. For example, the optical sensors 718(8) may be sensitive to infrared light, and infrared light sources such as light emitting diodes (LEDs) may provide illumination.

The optical sensors 718(8) may include photodiodes, photoresistors, photovoltaic cells, quantum dot photoconductors, bolometers, pyroelectric infrared detectors, and so forth. For example, the optical sensor 718(8) may use germanium photodiodes to detect infrared light.

One or more radio frequency identification (RFID) readers 718(9), near field communication (NFC) systems, and so forth, may be included as sensors 718. For example, the RFID readers 718(9) may be configured to read the RF tags 806. Information acquired by the RFID reader 718(9) may be used by the inventory management system 152 to identify an object associated with the RF tag 806 such as the item 704, the user 102, the tote 716, and so forth. For example, based on information from the RFID readers 718(9) detecting the RF tag 806 at different times and RFID readers 718(9) having different locations in the facility 702, a velocity of the RF tag 806 may be determined.

One or more RF receivers 718(10) may also be included as sensors 718. In some implementations, the RF receivers 718(10) may be part of transceiver assemblies. The RF receivers 718(10) may be configured to acquire RF signals 808 associated with Wi-Fi, Bluetooth, ZigBee, 4G, 3G, LTE, or other wireless data transmission technologies. The RF receivers 718(10) may provide information associated with data transmitted via radio frequencies, signal strength of RF signals 808, and so forth. For example, information from the RF receivers 718(10) may be used by the inventory management system 152 to determine a location of an RF source, such as a communication interface onboard the tote 716.

The sensors 718 may include one or more accelerometers 718(11), which may be worn or carried by the user 102, mounted to the tote 716, and so forth. The accelerometers 718(11) may provide information such as the direction and magnitude of an imposed acceleration. Data such as rate of acceleration, determination of changes in direction, speed, and so forth, may be determined using the accelerometers 718(11).

A gyroscope 718(12) may provide information indicative of rotation of an object affixed thereto. For example, the tote 716 or other objects may be equipped with a gyroscope 718(12) to provide data indicative of a change in orientation of the object.

A magnetometer 718(13) may be used to determine an orientation by measuring ambient magnetic fields, such as the terrestrial magnetic field. The magnetometer 718(13) may be worn or carried by the user 102, mounted to the tote 716, and so forth. For example, the magnetometer 718(13) mounted to the tote 716 may act as a compass and provide information indicative of which direction the tote 716 is oriented.

An optical sensor array 718(14) may comprise one or more optical sensors 718(8). The optical sensors 718(8) may be arranged in a regular, repeating, or periodic two-dimensional arrangement such as a grid. The optical sensor array 718(14) may generate image data 140. For example, the optical sensor array 718(14) may be arranged within or below fixture 714 and obtain information about shadows of items 704, hand of the user 102, and so forth.

The sensors 718 may include proximity sensors 718(15) used to determine presence of an object, such as the user 102, the tote 716, and so forth. The proximity sensors 718(15) may use optical, electrical, ultrasonic, electromagnetic, or other techniques to determine a presence of an object. In some implementations, the proximity sensors 718(15) may use an optical emitter and an optical detector to determine proximity. For example, an optical emitter may emit light, a portion of which may then be reflected by the object back to the optical detector to provide an indication that the object is proximate to the proximity sensor 718(15). In other implementations, the proximity sensors 718(15) may comprise a capacitive proximity sensor 718(15) configured to provide an electrical field and determine a change in electrical capacitance due to presence or absence of an object within the electrical field.

The proximity sensors 718(15) may be configured to provide sensor data indicative of one or more of a presence or absence of an object, a distance to the object, or characteristics of the object. An optical proximity sensor 718(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 718 such as an image sensor 718(3). Based on an apparent distance between the features of the structured light pattern, the distance to the object may be calculated. Other techniques may also be used to determine distance to the object. In another example, the color of the reflected light may be used to characterize the object, such as skin, clothing, tote 716, and so forth.

The sensors 718 may also include an instrumented autofacing unit (IAFU) 718(16). The IAFU 718(16) may comprise a position sensor configured to provide data indicative of displacement of a pusher. As an item 704 is removed from the IAFU 718(16), the pusher moves, such as under the influence of a spring, and pushes the remaining items 704 in the IAFU 718(16) to the front of the fixture 714. By using data from the position sensor, and given item data such as a depth of an individual item 704, a count may be determined, based on a change in position data. For example, if each item 704 is 1 inch deep, and the position data indicates a change of 17 inches, the quantity held by the IAFU 718(16) may have changed by 17 items 704. This count information may be used to confirm or provide a cross check for a count obtained by other means, such as analysis of the weight data, the capacitance data, the image data 140, and so forth.

The sensors 718 may include other sensors 718(S) as well. For example, the other sensors 718(S) may include light curtains, ultrasonic rangefinders, thermometers, barometric sensors, air pressure sensors, hygrometers, and so forth. For example, the inventory management system 152 may use information acquired from thermometers and hygrometers in the facility 702 to direct the user 102 to check on delicate items 704 stored in a particular fixture 714, which is overheating, too dry, too damp, and so forth.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged in front of the fixture 714, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 102 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 102 and the sheet of infrared light. In some implementations, a pair of light curtains may be arranged at right angles relative to one another, allowing for the determination of a width and height of an object in a plane. Input from the light curtain, such as indicating occlusion from the user 102 may be used to generate the entry data 150, the interaction data 720, and so forth. For example, the proximity sensor 130 may comprise a light plane.

In some implementations, the image sensor 718(3) or other sensors 718(S) may include hardware processors, memory, and other elements configured to perform various functions. For example, the image sensors 718(3) may be configured to generate image data 140, send the image data 140 to another device such as the server 804, and so forth.

The analysis module 144 may use data from one or more of the sensors 718. For example, the portal 120 may include a weight sensor 718(1) that detects the presence of a user 102 based on their weight.

The facility 702 may include one or more access points 810 configured to establish one or more wireless networks. The access points 810 may use Wi-Fi, NFC, Bluetooth, or other technologies to establish wireless communications between a device and the network 802. The wireless networks allow devices to communicate with one or more of the sensors 718, the inventory management system 152, the optical sensor arrays 718(14), the tag 806, a communication device of the tote 716, or other devices.

Output devices 812 may also be provided in the facility 702. The output devices 812 are configured to generate signals, which may be perceived by the user 102 or detected by the sensors 718. In some implementations, the output devices 812 may be used to provide illumination of the optical sensor array 718(14).

Haptic output devices 812(1) are configured to provide a signal that results in a tactile sensation to the user 102. The haptic output devices 812(1) may use one or more mechanisms such as electrical stimulation or mechanical displacement to provide the signal. For example, the haptic output devices 812(1) may be configured to generate a modulated electrical signal, which produces an apparent tactile sensation in one or more fingers of the user 102. In another example, the haptic output devices 812(1) may comprise piezoelectric or rotary motor devices configured to provide a vibration, which may be felt by the user 102.

One or more audio output devices 812(2) may be configured to provide acoustic output. The acoustic output includes one or more of infrasonic sound, audible sound, or ultrasonic sound. The audio output devices 812(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 812(3) may be configured to provide output, which may be seen by the user 102 or detected by a light-sensitive sensor such as an image sensor 718(3) or an optical sensor 718(8). In some implementations, the display devices 812(3) may be configured to produce output in one or more of infrared, visible, or ultraviolet light. The output may be monochrome or in color. The display devices 812(3) may be one or more of emissive, reflective, microelectromechanical, and so forth. An emissive display device 812(3), such as using LEDs, is configured to emit light during operation. In comparison, a reflective display device 812(3), such as using an electrophoretic element, relies on ambient light to present an image. Backlights or front lights may be used to illuminate non-emissive display devices 812(3) to provide visibility of the output in conditions where the ambient light levels are low.

The display devices 812(3) may be located at various points within the facility 702. For example, the addressable displays may be located at the portal 120, on the fixtures 714, totes 716, on the floor of the facility 702, and so forth.

Other output devices 812(P) may also be present. For example, the other output devices 812(P) may include scent/odor dispensers, document printers, 3D printers or fabrication equipment, and so forth.

Figure 9:
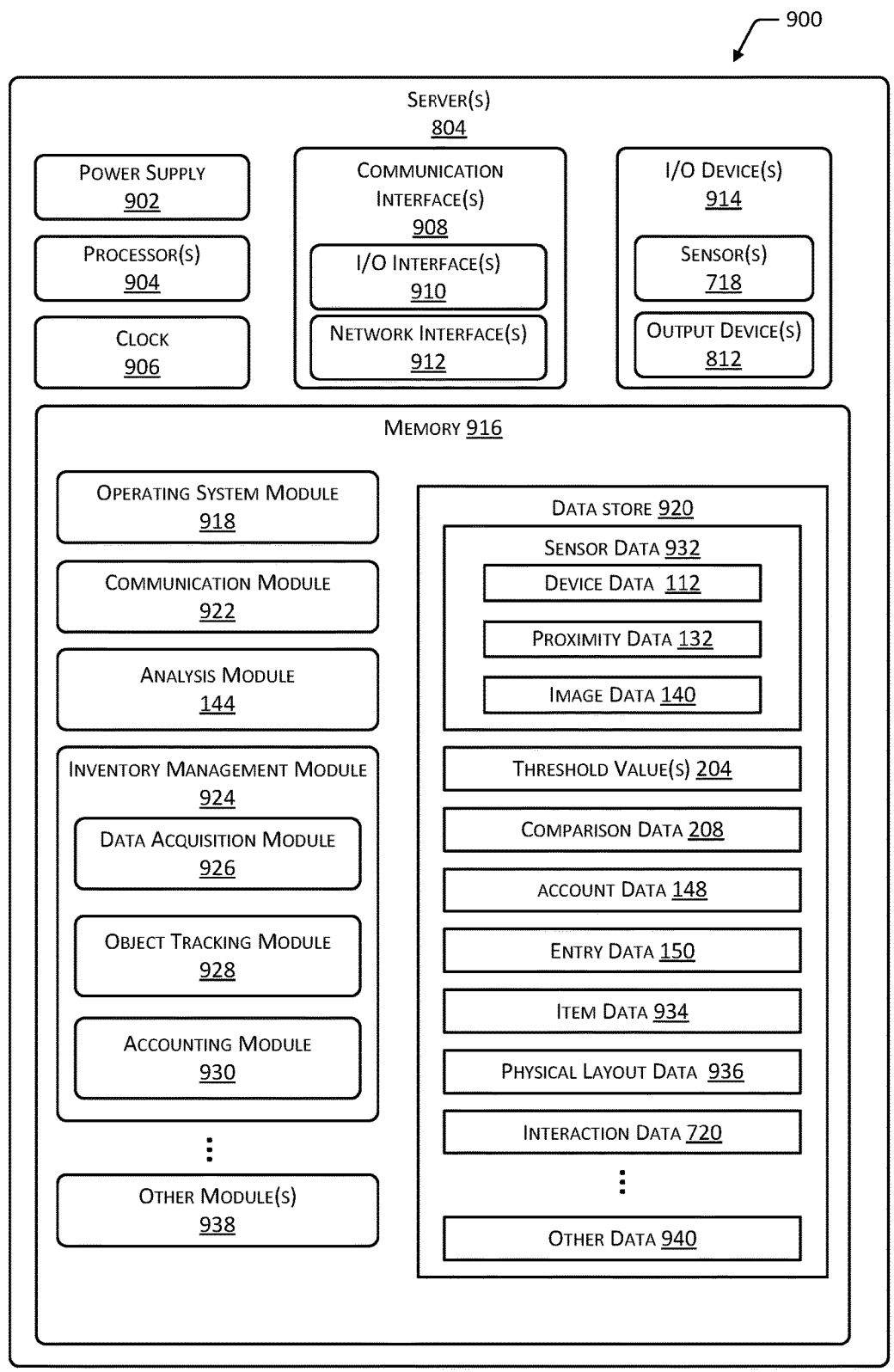
FIG. 9 illustrates a block diagram of a server configured to support operation of the facility, according to some implementations.

FIG. 9 illustrates a block diagram 900 of a server 804 configured to support operation of the facility 702, according to some implementations. For example, the computing device 134 may comprise a server 804. The server 804 may be physically present at the facility 702, may be accessible by the network 802, or a combination of both. The server 804 does not require end-user knowledge of the physical location and configuration of the system that delivers the services. Common expressions associated with the server 804 may include "on-demand computing", "software as a service (SaaS)", "platform computing", "network-accessible platform", "cloud services", "data centers", and so forth. Services provided by the server 804 may be distributed across one or more physical or virtual devices.

One or more power supplies 902 may be configured to provide electrical power suitable for operating the components in the server 804. The one or more power supplies 902 may comprise batteries, capacitors, fuel cells, photovoltaic cells, wireless power receivers, conductive couplings suitable for attachment to an external power source such as provided by an electric utility, and so forth. The server 804 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 804 may include one or more communication interfaces 908 such as input/output (I/O) interfaces 910, network interfaces 912, and so forth. The communication interfaces 908 enable the server 804, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 718, keyboard, mouse, scanner, and so forth. The I/O devices 914 may also include output devices 812 such as one or more of a display device 812(3), printer, audio speakers, and so forth. In some embodiments, the I/O devices 914 may be physically incorporated with the server 804 or may be externally placed.

The network interfaces 912 may be configured to provide communications between the server 804 and other devices, totes 716, routers, access points 810, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 804 may also include one or more busses or other internal communications hardware or software that allow for the transfer of data between the various modules and components of the server 804.

As shown in FIG. 9, the server 804 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 804. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including the servers 804, network attached storage devices, and so forth.

A communication module 922 may be configured to establish communications with one or more of the totes 716, sensors 718, display devices 812(3), other servers 804, or other devices. The communications may be authenticated, encrypted, and so forth.

The analysis module 144 as described above may be stored in the memory 916.

The memory 916 may store an inventory management module 924. The inventory management module 924 is configured to provide the inventory functions as described herein with regard to the inventory management system 152. For example, the inventory management module 924 may track items 704 between different fixtures 714, to and from the totes 716, and so forth.

The inventory management module 924 may include one or more of a data acquisition module 926, an object tracking module 928, an accounting module 930, and so forth. The data acquisition module 926 may be configured to acquire and access information associated with operation of the facility 702. For example, the data acquisition module 926 may be configured to acquire sensor data 932 such as the device data 112, proximity data 132, the image data 140, and so forth. The sensor data 932 may be accessed by the other modules for use.

The data store 920 may also store item data 934. The item data 934 provides information about a particular type of item 704, including characteristics of that type of item 704 such as physical dimensions, where that type of item 704 is located in the facility 702, characteristics about how the item 704 appears, and so forth.

The inventory management module 924 may utilize physical layout data 936. The physical layout data 936 may provide information indicative of location of the sensors 718 and the fixtures 714 in the facility 702 with respect to one another, and so forth. For example, the physical layout data 936 may comprise information representative of a map or floor plan of the facility 702 with relative positions of the fixtures 714 therein, planogram data indicative of how items 704 are to be arranged at the fixtures 714, and so forth.

The physical layout data 936 may associate a particular fixture ID with other information such as physical layout data, sensor position data, sensor direction data, sensor identifiers, and so forth. The physical layout data 936 provides information about where in the facility 702 objects are, such as the fixture 714, the sensors 718, and so forth. In some implementations, the physical layout data 936 may be relative to another object. For example, the physical layout data 936 may indicate that a particular weight sensor 718(1), capacitive sensor 718(2), or image sensor 718(3) is associated with the shelf or portion thereof.

The object tracking module 928 may access information from sensors 718 within the facility 702, such as those at the fixture 714, onboard the tote 716, carried by or worn by the user 102, and so forth. The object tracking module 928 may use the information in the entry data 150 that is indicative of a particular account associated with the user 102 as they enter the facility 702 to associate that account with the subsequent actions of the user 102. For example, as the user 102 enters the facility 702 and is identified at the portal 120, that identity is associated with them. The cameras 138 at the portal 120 and elsewhere in the facility 702 may then utilize blob tracking to track the movement of the user 102 throughout the facility 702. Subsequent actions by the user 102, such as a pick or place, may then be associated with that user account.

The accounting module 930 may be configured to use the entry data 150 to determine the ingress and egress of the user 102, generate payroll information, and so forth.

The inventory management module 924, and modules associated therewith, may access sensor data 932, threshold values 204, and so forth. The threshold values 204 may comprise one or more thresholds, ranges, percentages, and so forth, that may be used by the various modules in operation.

The inventory management module 924 may generate output data. For example, the output data may include the interaction data 720, inventory levels for individual types of items 704, overall inventory, and so forth.

Processing sensor data 932, such as the image data 140, may be performed by a module implementing, at least in part, one or more of the following tools or techniques. In one implementation, processing of the image data 140 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 932. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 932 or other data. For example, the ANN may be a trained using a supervised learning algorithm such that object identifiers are associated with images of particular objects within training images provided to the ANN. Once trained, the ANN may be provided with the sensor data 932 and the item data 934 to allow for a determination of similarity between two or more images.

Other data 940 may be stored in the data store 920 as well as other modules 938 in the memory 916. For example, the other modules 938 may include a speech recognition module while the other data 940 may include information about the speech of the user 102.

Figure 10:
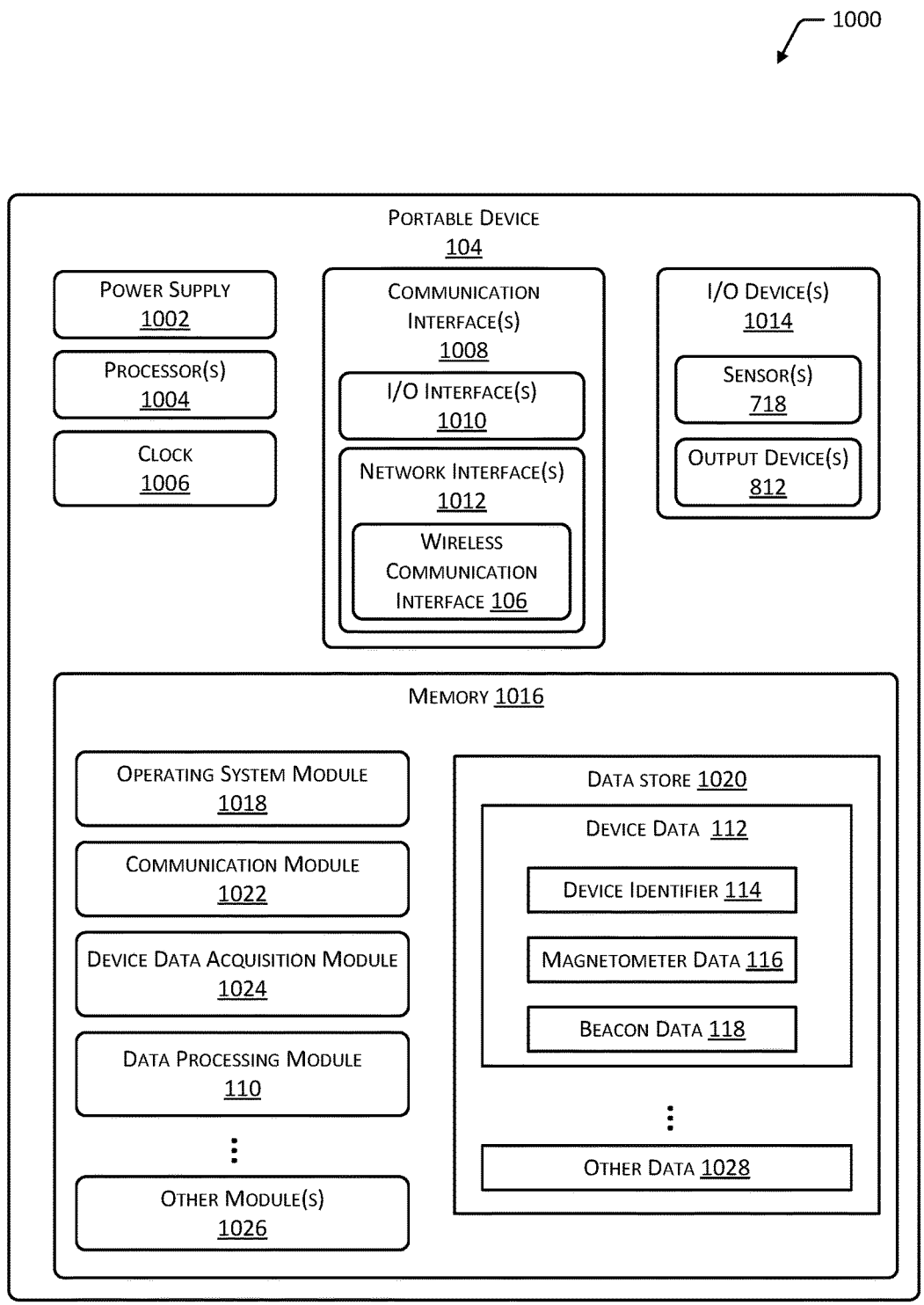
FIG. 10 illustrates a block diagram of a portable device configured to participate with operation of the portal, according to some implementations.

FIG. 10 illustrates a block diagram 1000 of a portable device 104 configured to participate with operation of the portal 120, according to some implementations.

The portable device 104 may comprise one or more of a smartphone, wearable computer, fitness tracker, name tag, identification badge, and so forth.

Similar to the server 804 described above, the portable device 104 may include one or more power supplies 1002. For example, the power supply 1002 may comprise a rechargeable battery, fuel cell, single-use primary cell, and so forth. The portable device 104 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to associate a particular interaction with a particular point in time.

The portable device 104 may include one or more communication interfaces 1008 such as I/O interfaces 1010, network interfaces 1012, and so forth. The communication interfaces 1008 enable the portable device 104, or components thereof, to communicate with other devices or components. The communication interfaces 1008 may include one or more I/O interfaces 1010. The I/O interfaces 1010 may comprise I2C, SPI, USB, RS-232, and so forth.

The I/O interface(s) 1010 may couple to one or more I/O devices 1014. The I/O devices 1014 may include input devices such as one or more of a sensor 718, keyboard, mouse, scanner, and so forth. The I/O devices 1014 may also include output devices 812 such as one or more of a display device 812(3), audio speakers, and so forth. In some embodiments, the I/O devices 1014 may be physically incorporated with the portable device 104 or may be externally placed.

The network interfaces 1012 may be configured to provide communications between the portable device 104, the portal 120, the totes 716, routers, access points 810, and so forth. The network interfaces 1012 may include devices configured to couple to PANs, LANs, WLANS, WANs, and so forth. For example, the network interfaces 1012 may include one or more wireless communication interfaces 106 that are compatible with Ethernet, Wi-Fi, Bluetooth, ZigBee, and so forth. In some implementations the network interfaces 1012 may include a wireless cellular data network interface. For example, the wireless cellular data network interface may allow connection to a 3G, 4G, LTE, or other cellular data network.

The portable device 104 may also include one or more busses or other internal communications hardware or software that allow for the transfer of data between the various modules and components of the portable device 104.

As shown in FIG. 10, the portable device 104 includes one or more memories 1016. The memory 1016 may comprise one or more non-transitory CRSM. The memory 1016 provides storage of computer-readable instructions, data structures, program modules, and other data for the operation of the portable device 104. A few example functional modules are shown stored in the memory 1016, although the same functionality may alternatively be implemented in hardware, firmware, or as a SoC.

The memory 1016 may include at least one OS module 1018. The OS module 1018 is configured to manage hardware resource devices such as the I/O interfaces 1010, the I/O devices 1014, the communication interfaces 1008, and provide various services to applications or modules executing on the processors 1004. The OS module 1018 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1016 may be a data store 1020 and one or more of the following modules. These modules may be executed as foreground applications, background tasks, daemons, and so forth. The data store 1020 may use a flat file, database, linked list, tree, executable code, script, or other data structure to store information. In some implementations, the data store 1020 or a portion of the data store 1020 may be distributed across one or more other devices including the servers 804, network attached storage devices, and so forth.

A communication module 1022 may be configured to establish communications with the portal 120 or devices associated therewith. The communications may be authenticated, encrypted, and so forth. In some implementations, the communication module 1022 may provide functionality, such as decrypting beacon data 118 that is encrypted, encrypting the device data 112 prior to transmission, and so forth.

The memory 1016 may store a device data acquisition module 1024. The device data acquisition module 1024 may be configured to acquire information from sensors onboard or in communication with the portable device 104. For example, device data acquisition module 1024 may access raw magnetometer data from the magnetometer 108 on the portable device 104.

As described above, the data processing module 110 may generate the device data 112, respond to beacons, transmit the device data 112, and so forth.

In some implementations, the data processing module 110 may send the device data 112 to the computing device 134, the server 804, or other devices. For example, the data processing module 110 may use the communication module 1022 to establish a connection with the server 804 and send the device data 112 instead of or in addition to using the connection, rather than the wireless communication interface 136 at the gate 142.

Other modules 1026 may also be present in the memory 1016 as well as other data 1028 in the data store 1020. For example, the other modules 1026 may include a biometric authentication module that utilizes data from a fingerprint reader device to authenticate a user 102 and the other data 1028 may include fingerprint data.

By using the devices and techniques described in this disclosure, users 102 may easily enter and exit the facility 702 without having to stop and present credentials. This improves throughput through the portals 120, reduces bottlenecks, allows for greater utilization of the portals 120 and net reduction in the amount of equipment needed, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a magnet configured to produce a magnetic field within a three-dimensional volume;
   an infrared proximity sensor comprising an infrared transmitter and an infrared receiver, the infrared proximity sensor configured to generate proximity data indicative of a user within the three-dimensional volume at a first time;
   a receiver;
   a memory, storing computer-executable instructions; and
   a hardware processor to execute the computer-executable instructions to:
     receive the proximity data;
     determine presence of the user at the first time based on the proximity data;
     receive, using the receiver, device data transmitted by a portable device, wherein the device data includes a device identifier and magnetometer data that was obtained at least in part at a second time;
     determine the magnetometer data is indicative of the magnetic field;
     determine the first time and the second time are within a threshold time of one another;
     access user account information associated with the device identifier; and
     generate entry data that indicates the user is associated with the user account information associated with the device identifier.

2. The system of claim 1, the computer-executable instructions to determine the magnetometer data is indicative of the magnetic field comprising instructions to:
   determine an expected magnetic field value indicative of an expected field strength of the magnetic field at the three-dimensional volume;
   determine a measured magnetic field strength value using the magnetometer data, wherein the magnetometer data is indicative of field strengths measured by a plurality of magnetometers and the measured magnetic field strength value comprises a sum of the field strengths; and
   determine the measured magnetic field strength value is within a threshold value of the expected magnetic field value.

3. The system of claim 1, wherein the magnet comprises a permanent magnet and further comprising a support structure to maintain the magnet at a height of between two and six feet above ground.

4. A system comprising:
   one or more magnets configured to produce a magnetic field that extends into a volume;
   a receiver;
   a memory, storing first computer-executable instructions; and
   a hardware processor to execute the first computer-executable instructions to:
     receive, using the receiver, device data transmitted by a portable device, wherein the device data includes an identifier and magnetometer data generated by the portable device;
     determine the magnetometer data is indicative of the magnetic field produced by the one or more magnets;
     determine account information associated with the identifier; and
     generate entry data that indicates an object associated with the account information has passed through the volume.

5. The system of claim 4, the first computer-executable instructions to determine the magnetometer data is indicative of the magnetic field produced by the one or more magnets further comprising instructions to:
   determine a plurality of magnetic field strength values obtained from a plurality of magnetometers;
   determine a total magnetic field value comprising a sum of absolute values of the plurality of magnetic field strength values; and
   determine the total magnetic field value is within a threshold value of an expected magnetic field value.

6. The system of claim 4, wherein the magnetometer data is indicative of the magnetic field produced by the one or more magnets at a first time;
the one or more magnets further comprising electromagnets configured to modulate the magnetic field produced by the one or more magnets at the first time; and
the first computer-executable instructions to determine the magnetometer data is indicative of the magnetic field produced by the one or more magnets further comprising instructions to:
access data indicative of modulation of the magnetic field produced by the one or more magnets at the first time; and
determine the magnetometer data indicates a modulated magnetic field that corresponds to the data indicative of the modulation of the magnetic field produced by the one or more magnets at the first time.

7. The system of claim 6, further comprising electronics configured to modulate the magnetic field produced by the one or more magnets by driving the electromagnets with one or more alternating currents at one or more frequencies.

8. The system of claim 6, further comprising:
one or more magnetometers within at least a portion of the magnetic field produced by the one or more magnets; and
the first computer-executable instructions further comprising instructions to:
receive magnetic field data from the one or more magnetometers; and
generate the data indicative of the modulation of the magnetic field produced by the one or more magnets using the magnetic field data.

9. The system of claim 4, further comprising:
at least one proximity sensor configured to scan at least a portion of the volume that includes the magnetic field produced by the one or more magnets; and
the hardware processor to further execute the first computer-executable instructions to:
generate proximity data indicative of the object as detected by the at least one proximity sensor at a first time; and
determine the magnetometer data was obtained at a second time that is within a threshold window of time of the first time.

10. The system of claim 4, wherein one or more of the one or more magnets comprises a permanent magnet and further comprising a support structure to maintain the one or more magnets at a height of between two and six feet above ground.

11. A system comprising:
a portal comprising:
one or more magnets configured to produce a magnetic field that extends into a volume;
a receiver;
a first memory storing first computer-executable instructions; and
a first hardware processor to execute the first computer-executable instructions to:
receive, using the receiver at the portal, device data transmitted by a portable device, the device data including a device identifier and magnetometer data generated by the portable device;
determine the magnetometer data is indicative of the magnetic field produced by the one or more magnets at the portal;
access account information associated with the device identifier; and
generate entry data that indicates a user is associated with the account information associated with the device identifier.

12. The system of claim 11, the portal further comprising:
a proximity sensor configured to generate proximity data indicative of the user within the volume; and
the first hardware processor to further execute the first computer-executable instructions to:
determine the proximity data; and
determine presence of the user based on the proximity data.

13. The system of claim 11, the first computer-executable instructions to determine the magnetometer data is indicative of the magnetic field produced by the one or more magnets at the portal further comprising instructions to:
determine an expected magnetic field value indicative of an expected field strength of the magnetic field at the volume;
determine a measured magnetic field strength value using the magnetometer data, wherein the magnetometer data is indicative of field strengths measured by a plurality of magnetometers and the measured magnetic field strength value comprises a sum of the field strengths; and
determine the measured magnetic field strength value is within a threshold value of the expected magnetic field value.

14. The system of claim 11, further comprising:
the portable device comprising:
at least one magnetometer;
a second memory storing second computer-executable instructions; and
a second hardware processor to execute the second computer-executable instructions to:
generate the magnetometer data using the at least one magnetometer, the magnetometer data indicative of a magnetic field strength detected by the at least one magnetometer; and
transmit the device data including the device identifier and the magnetometer data.

15. The system of claim 14, the portable device further comprising a wireless communication interface; and the second hardware processor to further execute the second computer-executable instructions to:
transmit a first message using the wireless communication interface;
receive a second message; and
transition the at least one magnetometer from a low power mode to an operational mode, wherein the generation of the magnetometer data occurs while in the operational mode.

16. The system of claim 14, the portal further comprising a beacon transmitter; the portable device further comprising a wireless communication interface; and the second hardware processor to further execute the second computer-executable instructions to:
receive beacon data transmitted by the beacon transmitter, using the wireless communication interface;
determine a received signal strength indicator (RSSI) value of the beacon data exceeds a threshold value; and
transition the at least one magnetometer from a low power mode to an operational mode, wherein the generation of the magnetometer data occurs while in the operational mode; and wherein the device data includes the beacon data and the received RSSI value.

17. The system of claim 14, the second hardware processor to further execute the second computer-executable instructions to:
   transmit an advertisement message indicative of presence of the portable device;
   receive a connection request message from the portal; and
   wherein the generation of the magnetometer data is responsive to the connection request message.

18. The system of claim 14, the second hardware processor to further execute the second computer-executable instructions to:
   calibrate the at least one magnetometer.

19. The system of claim 14, the second hardware processor to further execute the second computer-executable instructions to:
   detect a level of confidence associated with detection of the magnetic field produced by the one or more magnets at the portal.

20. The system of claim 14, wherein the portable device further comprises:
   a wireless cellular network interface;
   a display;
   a touch sensor; and
   a rechargeable battery.

* * * * *